(12) United States Patent
Sikes

(10) Patent No.: US 12,070,044 B2
(45) Date of Patent: Aug. 27, 2024

(54) FORTIFIED MILK COMPOSITIONS AND THEIR PROCESSES OF PREPARATION

(71) Applicant: AQUERO CANADA LTD., Calgary (CA)

(72) Inventor: C. Steven Sikes, Eugene, OR (US)

(73) Assignee: AQUERO CANADA LTD., Calgary (CA)

( * ) Notice: Subject to any disclaimer, the term of this patent is extended or adjusted under 35 U.S.C. 154(b) by 78 days.

(21) Appl. No.: 17/432,775

(22) PCT Filed: Feb. 24, 2020

(86) PCT No.: PCT/CA2020/050235
§ 371 (c)(1),
(2) Date: Aug. 20, 2021

(87) PCT Pub. No.: WO2020/168439
PCT Pub. Date: Aug. 27, 2020

(65) Prior Publication Data
US 2022/0000132 A1  Jan. 6, 2022

Related U.S. Application Data

(60) Provisional application No. 62/809,119, filed on Feb. 22, 2019.

(51) Int. Cl.
*A23C 9/18* (2006.01)
*A23C 9/13* (2006.01)
(Continued)

(52) U.S. Cl.
CPC .......... *A23C 9/1422* (2013.01); *A23C 9/1322* (2013.01); *A23C 9/16* (2013.01); *A23C 9/1528* (2013.01); *A23C 2210/208* (2013.01)

(58) Field of Classification Search
CPC ....... A23C 9/1422; A23C 9/1322; A23C 9/16; A23C 9/1528; A23C 2210/208
(Continued)

(56) References Cited

U.S. PATENT DOCUMENTS 2,015,496 A    9/1935  Platt
3,297,455 A    1/1967  Ogden
(Continued)

FOREIGN PATENT DOCUMENTS

CN    101422240 A    5/2009
CN    101530129 B    9/2009
(Continued)

OTHER PUBLICATIONS

Singh et al., Applications of Super Critical Fluid Extraction in Milk and Dairy Industry: a Review, J Food Process Technol 2018, 9:12 (Year: 2018).*

(Continued)

*Primary Examiner* — Brent T O'Hern
(74) *Attorney, Agent, or Firm* — MBM Intellectual Property Law LLP

(57) ABSTRACT

The present invention provides a novel process for preparing fortified milk compositions from whole mammalian milk. The process of the present invention generally involves converting dried mammalian milk into a fats-enriched fraction, a protein-enriched fraction, and a carbohydrate-enriched fraction. The process comprises treating the dried milk with a fats extracting agent to provide a fats-enriched fraction, and a residual fraction comprising proteins and carbohydrates; separating said fats-enriched fraction from the residual fraction; and removing the fats extracting agent from the separated fats-enriched fraction to produce a dry fraction of oily, fats-enriched material and a fraction enriched in proteins and carbohydrates.

4 Claims, 4 Drawing Sheets

(51) Int. Cl.
    *A23C 9/142*     (2006.01)
    *A23C 9/16*     (2006.01)
    *A23C 9/152*     (2006.01)

(58) Field of Classification Search
    USPC ................................................ 426/580
    See application file for complete search history.

(56) References Cited

U.S. PATENT DOCUMENTS

| | | |
|---|---|---|
| 4,376,072 A | 3/1983 | Connolly |
| 4,519,945 A | 5/1985 | Ottenhof |
| 6,472,003 B2 | 10/2002 | Barrett-Reis |
| 7,659,111 B2 | 2/2010 | Meir |
| 7,935,478 B2 | 5/2011 | Natan |
| 8,147,894 B2 | 4/2012 | Euber |
| 8,197,872 B2 | 6/2012 | Mills |
| 8,287,931 B2 | 10/2012 | Rosales |
| 8,361,511 B2 | 1/2013 | Hill |
| 8,518,894 B2 | 8/2013 | Friel |
| 8,545,920 B2 | 10/2013 | Medo |
| 8,796,213 B2 | 8/2014 | Underwood |
| 8,927,027 B2 | 1/2015 | Fournell |
| 9,149,052 B2 | 11/2015 | Medo |
| 9,439,448 B2 | 9/2016 | Rosales |
| 9,457,058 B2 | 10/2016 | Hondmann |
| 9,539,269 B2 | 1/2017 | Chow |
| 9,574,169 B2 | 2/2017 | Corveleyn |
| 9,609,888 B2 | 4/2017 | Berg |
| 9,808,474 B2 | 11/2017 | Buck |
| 9,808,475 B2 | 11/2017 | German |
| 9,894,911 B2 | 2/2018 | Odaka |
| 10,716,816 B2 | 7/2020 | Kyle |
| 10,940,158 B2 | 3/2021 | Sangild |
| 11,020,413 B2 | 6/2021 | Sangild |
| 2004/0040448 A1* | 3/2004 | Dunker ............... A23C 9/1422 |
| | | 99/452 |
| 2009/0017176 A1 | 1/2009 | Sugawara |
| 2010/0197017 A1 | 8/2010 | Natan |
| 2011/0200610 A1 | 8/2011 | Ilan |
| 2011/0305764 A1 | 12/2011 | Kuklinski |
| 2017/0231262 A1 | 8/2017 | Banavara |
| 2018/0064739 A1 | 3/2018 | Chichlowski |
| 2018/0092374 A1 | 4/2018 | Fournell |
| 2018/0103675 A1 | 4/2018 | Chichlowski |

FOREIGN PATENT DOCUMENTS

| | | |
|---|---|---|
| CN | 102429031 B | 5/2012 |
| EP | 0064509 A1 | 11/1982 |
| EP | 0424414 A1 | 5/1991 |
| EP | 0450141 B1 | 10/1991 |
| EP | 1168929 B1 | 1/2002 |
| EP | 3791726 A1 | 3/2021 |
| JP | 2016220674 A | 12/2016 |
| KR | 20090122071 A | 11/2009 |
| KR | 20190032870 A | 3/2019 |
| WO | 00/60949 A2 | 10/2000 |
| WO | 2006026878 A1 | 3/2006 |
| WO | 2006041316 A1 | 4/2006 |
| WO | 2012030764 A2 | 3/2012 |
| WO | 2013011040 A1 | 1/2013 |
| WO | 2020168439 A1 | 8/2020 |
| WO | 2021/003575 A1 | 1/2021 |

OTHER PUBLICATIONS

Buyukbese et al., Supercritical Carbon Dioxide Fractionation of Anhydrous Milk Fat, J Am Oil Chem Soc (2014) 91:169-177 (Year: 2013).*

Mohamed et al., The Use of Supercritical Fluid Extraction Technology in Food Processing, Food Technology Magazine, Jun. 2002 (Year: 2002).*

Bomfim et al., Human milk enriched with human milk lyophilisate for feeding very low birth weight preterm infants: a preclinical experimental study focusing on fatty acid profile, PLoS ONE 13(9): e0202794, pp. 1-17. (Year: 2018).*

Janjindamai, W. and T. Chotsampancharoen. 2006. Effect of fortification on the osmolality of human milk. Journal of the Medical Association of Thailand 89, 1400-03.

Jarvinen, K.M. and H. Suomalainen. 2002. Leucocytes in human milk and lymphocyte subsets in cow's milk-allergic infants. Pediatric Allergy and Immunology 13, 243-54.

Jiang, R. and B. Lonnerdal. 2016. Biological roles of milk osteopontin. Current Opinion in Clinical Nutrition and Metabolic Care 19, 214-9.

Jones, F. 2003. History of North American donor milk banking: one hundred years of progress. Journal of Human Lactation 19, 313-18.

Tomasula, P. et al. Preparation of Casein Using Carbon Dioxide. 1995. J Diary Sci. 78:506-514.

Kakulas, F. 2015. Breast milk: a source of stem cells and protective cells for the infant. Infant 11, 187-191.

Keim, S.A., J.S. Hogan, K.A. McNamara, V. Gudimetla, C.E. Dillon, J.J. Kwiek, and S.R. Geraghty. 2013. Microbial contamination of human milk purchased via the internet. Pediatrics 132, e1227-e1235.

Khailova, L., K. Dvorak, K.M. Arganbright, C.S. Williams, M.D. Halpern, and B. Dvorak. 2009. Changes in hepatic cell junctions structure during experimental necrotizing enterocolitis: effect of EGF treatment. Pediatric Research 66, 140-4.

Kitano, N., K. Tsunoda, T. Tsuji, Y. Osuka, T. Jindo, K. Tanaka, and T. Okura. 2014. Association between difficulty initiating sleep in older adults and the combination of leisure-time physical activity and consumption of milk and milk products: a cross-sectional study. Biomed Central (BMC) Geriatrics 14, 118-25.

Knight, C.A., C.C. Cheng, and A.L. DeVries. 1991. Adsorption of α-helical antifreeze peptides on specific ice crystal surface planes. Biophysical Journal 59, 409-418.

Koch, L.E. 2002-2017. Discover the power of horsemilk. www.powerofhorsemilk.com (Netherlands).

Koettnitz, F. 2018. Freeze-drying of breast-milk. Electa European Lactation Consultants Alliance, Feb. 2018, p. 1-4.

Koo, W. and H. Tice. 2018. Human milk fortifiers do not meet the current recommendation for nutrients in very low birth weight infants. Journal of Parenteral and Enteral Nutrition 42, 813-820.

Kumaran, R.S. 2015-2018, Miracle Tree Life Science, www.miracletree.in.

Kunz, C., S. Rudloff, W. Baier, N. Klein, and S. Strobel. 2000. Oligosaccharides in human milk: structural, functional, and metabolic aspects. Annual Review of Nutrition 20, 699-722.

Lamireau, D. 2015. Lyophilization in the human milk of Marmande. Third international congress of the European milk bank association.

Larque, E., M. Sabater-Molina, and S. Zamora. 2007. Biological significance of dietary polyamines. Nutrition 23, 87-95.

Li, C., N.W. Solomons, M.E. Scott, and K.G. Koski. 2016. Minerals and trace elements in human breast milk are associated with Guatamalan infant anthropometric outcomes within the first 6 months. Journal of Nutrition 146, 2067-74.

Lin A.E., C.A. Autran, S.D. Española, L. Bode, and V. Nizet. 2014. Human milk oligosaccharides protect bladder epithelial cells against uropathogenic *Escherichia coli* invasion and cytotoxicity. The Journal of Infectious Diseases 209, 389-98.

Lin A.E., C.A. Autran, A. Szyszka, T. Escajadillo, M. Huang, K. Godula, A.R. Prudden, G. Boons, A.L. Lewis, K.S. Doran, V. Nizet, and L. Bode. 2017. Human milk oligosaccharides inhibit growth of group B *Streptococcus*. Journal of Biological Chemistry 292, 11243-49.

Linhardt, R. and H.G. Bazin. 2001. Separation and purification of carbohydrates. In: Fraser- Reid B.O., Tatsuta K., Thiem J. (eds.) Glycoscience: Chemistry and Chemical Biology I-III. Springer, Berlin, Heidelberg. Chapter 1.3, p. 63-74.

Liu, B. and D.S. Newburg. 2013. Human milk glycoproteins protect infants against human pathogens. Breastfeeding Medicine 8, 354-62.

Loser, C. 2000. Polyamines in human and animal milk. British Journal of Nutrition 84, 55-58.

(56) References Cited

OTHER PUBLICATIONS

Lozano, B., A.I. Castellote, R. Montes, and M.C. Lopez-Sabater. 2014. Vitamins, fatty acids, and antioxidant capacity stability during storage of freeze-dried human milk. International Journal of Food Science and Nutrition 65, 703-7.
Lucas, A., P.J. Lucas, S.I. Chavin, R.L. Lyster, and J.D. Baum. 1980. A human milk formula. Early Human Development 4, 15-21.
Machado, B.A.S., R.P.D. Silva, G. de Abreu Barreto, S.S. Costa, D.F. da Silva, H.N. Brandao, J.L.C. da Rocha, O.A. Dellagostin, J.A.P. Henriques, M.A. Umsza-Guez, and F.F. Padilha. 2016. Chemical composition and biological activity of extracts obtained by supercritical extraction and ethanolic extraction of brown, green and red propolis derived from different geographic regions in Brazil. PLOS One, p. 1-26.
Mahore, J.G., K.J. Wadher, M.J. Umekar, and P.K. Bhoyar. 2010. Ion exchange resins: pharmaceutical applications and recent advancement. International Journal of Pharmaceutical Sciences Review and Research 1, 8-13.
Malgorzata Witkowska-Zimny et al: "Milk Therapy; Unexpected Uses for Human Breast Milk", Nutrients, vol. 11, No. 5, p. 944, Apr. 26, 2019.
Malik, K.A. 1988. A new freeze-drying method for the preservation of nitrogen-fixing and other fragile bacteria. Journal of Microbiological Methods 8, 259-71.
Martin, C.R., P. Ling, and G.L. Blackburn. 2016. Review of infant feeding: key features of breast milk and infant formula. Nutrients 8, 279-89.
Martin, J.A., Hamilton, B.E., Osterman, M.J.K., and A.K. Driscoll. 2019. Births: Final Data for 2018, National Vital Statistics Reports, 67 pgs.
McHugh, M. and V. Krukonis. 2013. Supercritical fluid extraction: Principles and practice. 2nd edition. Butterworth-Heinemann. 608 p.
McJarrow, P., N. Schnell, J. Jumpsen, and T. Clandinin. 2009. Influence of dietary gangliosides on neonatal brain development. Nutrition Reviews 67, 451-63.
Mehra, R., P. Marnila, and H. Korhonen. 2006. Milk immunoglobulins for health promotion. International Dairy Journal 16, 1262-71.
Mercer, D. 2018. Ice crystal formation. The World of Food Science, 101. 3 pgs.
Minami, J., T. Odamaki, N. Hashikura, F. Abe, and J.Z. Xiao. 2016. Lysozyme in breast milk is a selection factor for bifidobacterial colonisation in the infant intestine. Beneficial Microbes 7, 53-60.
Miyamoto-Shinohara, Y., J. Sukenobe, T. Imaizumi, and T. Nakahara. 2008. Survival of freeze-dried bacteria. Journal of General and Applied Microbiology 54, 9-12.
Mizuno, K. 2019. Human milk bank and donor milk in Japan. International Society for Research in Human Milk and Lactation, First ISRHML China Workshop, Beijing. Abstract.
Moro, G.E., C. Billeaud, B. Rachel, J. Calvo, L. Cavallarin, L. Christen, D. Escuder-Vieco, A. Gaya, D. Lembo, A. Wesolowska, S. Arslanoglu, D. Barnett, E. Bertino, C-Y Boquein, C. Gebauer, A. Grovslien, G.A. Weaver, and J-C. Picaud. 2019. Processing of donor human milk: update and recommendations from the European Milk Bank Association (EMBA). Frontiers in Pediatrics 7, article 49, 1-10.
Morrow, A.L., G.M. Ruiz-Palacios, M. Altaye, X. Jiang, M.L. Guerrero, J.K. Meinzen-Derr, T. Farkas, P. Chaturvedi, L.K. Pickering, and D.S. Newburg. 2004. Human milk oligosaccharides are associated with protection against diarrhea in breast-fed infants. Journal of Pediatrics 145, 297-303.
Nagashima, K., K. Itoh, and T. Kuroume. 1990. Levels of insulin-like growth factor I in full- and preterm human milk in comparison to levels in cow's milk and in milk formulas. Biology of the Neonate 58, 343-6.
Nakamura, E., H. Uneyama and K. Torii. 2013. Gastrointestinal nutrient chemosensing and the gut-brain axis: Significance of glutamate signaling for normal digestion. Journal of Gastroenterology and Hepatology 28 (Suppl. 4): 2-8.

Newburg, D.S. 2013. Glycobiology of human milk. Biochemistry 78, 771-85.
Newburg, D.S., G.M. Ruiz-Palacios, M. Altaye, P. Chaturvedi, J. Meinzen-Derr, Mde L. Guerrero, and A.L. Morrow. 2004. Innate protection conferred by fucosylated oligosaccharides of human milk against diarrhea in breastfed infants. Glycobiology. 14, 253-63.
Newmark, L.M. 2017. Milk's bioactive ingredients help wounds heal faster. Splash! Milk Science Update, Feb. 2017.
Northrop, J.H. 1923. Note on the purification and precipitation of casein. Journal of General Physiology 5, 749-50.
O'Connor, C.J., J.R. Longbottom, and P. Walde. 1986. Inactivation of bile-salt-stimulated human milk esterase: effect of storage and heat. Journal of Pediatric Gastroenterology and Nutrition 5, 630-637.
O'Kennedy, B.T. 2011. Caseins. Chapter 2. In, Handbook of Food Proteins, Woodhead Series in Food Science, Technology and Nutrition, 13-29.
Oftedal, O.T. 2013. Origin and evolution of the major constituents of milk. In: McSweeney P., Fox P. (eds.), Advanced Dairy Chemistry. Springer, Boston, MA. p. 1-42.
Oliveira, D.L., A. Wilbey, A.S. Grandison, and L.B. Roseiro. 2015. Milk oligosaccharides: a review. International Journal of Dairy Technology 68, 305-21.
Dalli, J., N. Chiang, and C. N. Serhan. 2014. Identification of 14-series sulfido-conjugated mediators that promote resolution of infection and organ protection. Proceedings of the National Academy of Sciences 111, E4753-E4761.
Darragh, A,J, and P.J. Moughan, 1998. The amino acid composition of human milk corrected for amino acid digestibility. British Journal of Nutrition 80, 25-34.
Davies, D.P. 1997. Adequacy of expressed breast milk for early growth of preterm infants. Archives of Disease in Childhood 52, 296-301.
De Curtis, M., M. Canduso, C. Pieltain, and J. Rigo. 1999. Effect of fortification on the osmolality of human milk. Archives of Disease in Childhood. Fetal and Neonatal Edition 81, 141-43.
Dela Pena, I.J.I., E. Hong, J.B. de la Peña, H.J. Kim, C.J. Botanas, Y.S. Hong, Y.S. Hwang, B.S. Moon, and J.H. Cheong 2015. Milk collected at night induces sedative and anxiolytic-like effects and augments pentobarbital-Induced sleeping behavior in mice. Journal of Medicinal Food 18, 1255-61.
De Souza Grance, T.R., P. de Oliveira Serafin, D.M.C. Thomaz, and D.B. Palhares. 2015. Homologous human milk supplement for very low birth weight preterm infant feeding. Revista Paulista de Pediatria 33, 28-33.
Denizil, A. 2011. Plasma fractionation: conventional and chromatographic methods for albumin purification. Hacettepe Journal of Biology and Chemistry 39, 315-341.
Dionisi, F., et al.: "Supercritical CO2 Extraction for Total Fat Analysis of Food Products", Journal of Food Science, vol. 64, No. 4, 1999, pp. 612-615.
Ebaid, H., B. Abdel-Salam, I. Hassan, A. Al-Tamimi, A. Metwalli, and I. Alhazza. 2015. Camel milk peptide improves wound healing in diabetic rats by orchestrating the redox status and immune response. Lipids in Health and Disease. 14, 132-41.
Eidelman, A.I. and R.J. Schanler. 2012. Breastfeeding and the use of human milk. Pediatrics 129, e827-e841.
El-Shafei, M.M., N.S. Al-Amoudy, and A.K. Said. 1988 a. Effect of the drying process on the nutritive value of milk. Part 1. Biochemical composition. Die Nahrung Molecular Journal of Nutrition 32, 553-57.
El-Shafei, M.M., N.S. Al-Amoudy, and A.K. Said. 1988 b. Effect of the drying process on the nutritive value of milk. Part 2. Biological evaluation. Die Nahrung Molecular Journal of Nutrition 32, 559-64.
Erkman, O. 1997. Antimicrobial effect of pressurized CO2 on *Staphylococcus aureus* in broth and milk. Journal of Food Science and Technology 71, 826-829.
Farahani, L.A., M. Ghobadzadeh, and P. Yousefi. 2013. Comparison of the effect of human milk and topical hydrocortisone 1% on diaper dermatitis. Pediatric Dermatology 30, 725-729.
Fatemeh, S., S. Mustafa, A. Ariff, and Y.A. Manap. 2011. Optimization of a cryoprotective medium and survival of freeze-dried Bifidobacterium infantis 20088 throughout storage, rehydration and

(56) References Cited

OTHER PUBLICATIONS gastrointestinal tract transit for infant formula probiotic applications. African Journal of Microbiology Research 5, 3373-84.

Feskanich, D., H.E. Meyer, T.T. Fung, H.A. Bischoff-Ferrari et al., and W.C. Willett. Milk and other dairy foods and risk of hip fractures: a prospective study among postmenopausal women. 2018. Osteoporosis International 29, 385-396.

Fichter, M., M. Klotz, D.L. Hirschberg, B. Waldura, O. Schofer, S. Ehnert, L.K. Schwarz, C.V. Ginneken, and K.H. Schäfer. 2011. Breast milk contains relevant neurotrophic factors and cytokines for enteric nervous system development. Molecular Nutrition and Food Research 55, 1592-6.

Friel, J.K., A. Tsopmo, B. Diehl-Jones, and R. Aluko. 2008. Antioxidant properties of human milk fractions. The FASEB Journal 22, 446.

Friend, B.A., K.M. Shahani, C.A. Long, and L.A. Vaughn, 1983, Evaluation of freeze-drying, pasteurization, high-temperature heating and storage on selected enzymes, B-vitamins, and lipids of mature human milk. Journal of Food Protection 46, 330-334.

Friend, B.A., K.M. Shahani,, C.A. Long, and L.A. Vaughn. 1983b. The effect of processing and storage on key enzymes, B vitamins, and lipids of mature human milk I. Evaluation of fresh samples and effects of freezing and frozen storage. Pediatric Research 17, 61-64.

Food and Drug Administration. 2013. Ion exchange resins. Code of Federal Registration CFR 21, 173.25, 124-128.

Food and Drug Administration. 2018. Infant formula: the addition of minimum and maximum levers of Selenium to infant formula and related labeling requirements. Code of Federal Registration CFR 80, 35834-35841.

Fusch, G., N. Rochow, A. Choi, S. Fusch, S. Poeschl, A. O. Ubah, S-Y Lee, P. Raja, and C. Fusch. 2015. Rapid measurement of macronutrients in breast milk: How reliable are infrared milk analyzers. Clinical Nutrition 34, 465-76.

Garofalo, R. 2010. Cytokines in human milk. The Journal of Pediatrics 156, Suppl. 1, 36-40.

Goldman, A.S. 1993. The immune system of human milk: antimicrobial, antiinflammatory and immunomodulating properties. The Pediatric Infectious Disease Journal 12, 664-71.

Gomez-Gallego, C., M.C. Collado, G. Perez, T. Ilo, U.M. Jaakkola, M.J. Bernal, M. J. Periago, R. Frias, G. Ros, and S. Salminen. 2013. Resembling breast milk: influence of polyamine-supplemented formula on neonatal BALB/cOlaHsd mouse microbiota. British Journal of Nutrition 111, 1050-58.

Gopinath, B., V.M. Flood, J.C. Louie, J.J. Wang, G. Burlutsky, E. Rochtchina, and P. Mitchell. 2014. Consumption of dairy products and the 15-year incidence of related macular degeneration. British Journal of Nutrition 111, 1673-79.

Gozen, D., S. Caglar, S. Bayraktar, and F. Atici. 2014. Diaper dermatitis care of newborns human breast milk or barrier cream. Journal of Clinical Nursing 23, 515-23.

Greaves, R.I.N. 1960. Preservation of living cells by freeze-drying. Annals of the New York Academy of Sciences 13, 723-8.

Gurnida, D.A., A.M. Rowan, P. Idjradinata, D. Muchtadi, and N. Sekarwana. 2012. Association of complex lipids containing gangliosides with cognitive development of 6-month-old infants. Early Human Development 88, 595-601.

Gutierrez, D. and J.A.G. de Almeida. 1998. Currents in human milk banking: human milk banks in Brazil. Journal of Human Lactation 14, 333-5.

Hahn-Holbrook, T.B. Le, A. Chung, E.P. Davis, and L.M. Glynn. 2016. Cortisol in human milk predicts child BMI (body mass index). Obesity 24, 2471-2474.

Hartel, R.W. 2001. Crystallization in Foods. Springer. 325 pgs.

Hassiotou, F., A. Beltran, E. Chetwynd, A.M. Stuebe, A-J Twigger, P. Metzger, N. Trengove, C.T. Lai, L. Filgueira, P. Blancafort, and P.E. Hartmann. 2012. Breastmilk Is a Novel Source of Stem Cells with Multilineage Differentiation Potential. Stem Cells 2012, 2164-2174.

Hassiotou, F., D.T. Geddes, and P.E. Hartmann. 2013. Cells in human milk: state of the science. Journal of Human Lactation 29, 171-82.

Hassiotou, F., A. Mobley, D. Geddes, P. Hartmann, and T. Wilkie. 2015. Breastmilk imparts mother's stem cells to the infant. FASEB Journal 29, 876.

Heckly, R.J. 1985. Principles of preserving bacteria by freeze-drying. Developments in Industrial Microbiology 26, 379-395.

Hempsey, W. 2015. They don't call it liquid gold for nothing. Myrtle Beach Birth Services.

Hofland, G.W., M van Es, L.A.M van der Wielen, and G-J Witkamp. 1999. Isoelectric precipitation of casein using high-pressure $CO_2$. Industrial and Engineering Chemistry Research 38, 4919-27.

Hofland, G.W., M. Berkhoff, G.J. Witkamp, and L.A.M. van der Wielen. 2003. Dynamics of precipitation of casein with carbon dioxide. International Dairy Journal 13, 685-97.

Honour, P. and J.M. Dolby. 1979. Bacteriostasis of *Escherichia coli* by milk. III. The activity and stability of early, transitional and mature human milk collected locally. Journal of Hygiene 83, 243-54.

Hossain, Z., W. Diehl-Jones, D.S. Mackay, A. Chui, and J.K. Friel. 2014. Human milk and the premature infant. In, Handbook of dietary and nutritional aspects of bottle feeding, chapter 18, Wageningen Academic, Eds. V.R. Preedy, R. R. Watson, and S. Zibadi. 34 p.

Hubalek, Z. 2003. Protectants used in the cryopreservation of microorganisms. Cryobiology 46, 205-229.

Human Milk Banking Association of North America (HMBANA). Jun. 2017. Milk Bank FAQ. www.kellymom.com.

Hylmo, P., S. Polberger, I. Axelsson, I. Jakobsson, and N. Raiha. 1984. Preparation of fat and protein from banked human milk: its use in feeding very-low-birth-weight infants. In, Human Milk Banking, A.F. Williams and J.D. Baum, eds. Vevey/Raven Press. pp. 55-6.

Idrus, N.F.M., L.N. Yian, Z. Idham, N.A. Aris, N.R. Putra, A.H.A. Aziz, and M.A.C. Yunus. 2018. Mini review: application of supercritical carbon dioxide in extraction of propolis extract. Malaysian Journal of Fundamental and Applied Sciences 14, 387-396.

Iskarpatyoti, J., E.A. Morse, R.P. McClung, M. Ikizler, J.D. Wetzel, N. Contractor, and T.S. Dermody. 2012. Serotype specific differences in inhibition of reovirus infectivity by human-milk glycans are determined by viral attachment protein. Virology 433, 489-97.

Iwamori, M., K. Takamizawa, M. Momoeda, Y. Iwamori, and Y Taketani. 2008. Gangliosides in human, cow and goat milk, and their abilities as to neutralization of cholera toxin and botulinum type A neurotoxin. Glycoconjugate Journal 25, 675-83.

Jablonka, M.S. and P.A. Munro. 1985. Particle size distribution and calcium content of batch- precipitated acid casein curd: effect of precipitation temperature and pH. Journal of Dairy Research 52, 419-28.

Yu, Z.T., N.N. Nanthakumar, D.S. Newburg. 2016. The Human Milk Oligosaccharide 2'-Fucosyllactose quenches Campylobacter jejuni-induced inflammation in human epithelial cells HEp-2 and HT-29 and in mouse intestinal mucosa. Journal of Nutrition 146, 1880-90.

Yuen, B.H. 1988. Prolactin in human milk: The influence of nursing and the duration of postpartum lactation. American Journal of Obstetrics and Gynecology 158, 583-6.

Simmer, K. The Knowns and Unknowns of Human Milk Banking. 2011. Abstract.

Tomasula, P. et al. A continuous process for casein production using high-pressure carbon dioxide. Journal of Food Engineering. vol. 33, 1997, Abstract.

Extended European Search Report dated Oct. 31, 2022 (Corresponding European Application No. 20758712.2).

Extended European Search Report dated Jun. 12, 2023 (Corresponding European Application No. 20837000.7).

International Search Report dated Apr. 29, 2020 (Corresponding International Application No. PCT/CA2020/050235 (WO2020168439)).

Written Opinion dated Apr. 29, 2020 (Corresponding International Application No. PCT/CA2020/050235 (WO2020168439)).

International Search Report dated Oct. 19, 2020 (Corresponding International Application No. PCT/CA2020/050952 (WO 2021/003575)).

(56) References Cited

OTHER PUBLICATIONS

Written Opinion dated Oct. 19, 2020 (Corresponding International Application No. PCT/CA2020/050952 (WO 2021/003575)).
Abdel-Salam, B.K. 2014. Modulatory effect of whey proteins in some cytokines involved in wound healing in male diabetic albino rats. Inflammation 37, 1616-1622.
Abrams, S.A., S. Landers, L.M. Noble, and B.B. Poindexter. 2017. Donor human milk for the high-risk infant: preparation, safety, and usage options in the United States. American Academy of Pediatrics, Policy Statement. Pediatrics 139, p. 1-6.
Adamkin, D.H. and J.A. Kerner. 2012. Mother's milk, feeding strategies, and lactoferrin to prevent necrotizing enterocolitis. Journal of parenteral and enteral nutrition 36, 25-29.
Adamkin, D.H. and P.G. Radmacher. 2014. Fortification of human milk in very low birth weight infants (VLBW, 1500 g birth weight). Clinical Perinatology 41, 405-21.
Alsaweed, M., C.T. Lai, P.E. Hartmann, D.T. Geddes, and F. Kakulas. 2016. Human milk miRNAs primarily originate from the mammary gland resulting in unique miRNA profiles of fractionated milk. Nature, Scientific Reports, 1-13.
Al-Shehri, S.S., C.L. Knox, H.G. Liley, D.M. Cowley, J.R. Wright, M.G. Henman, A.K. Hewavitharana, B.G. Charles , P.N. Shaw, E.L. Sweeney, and J.A. Duley. 2015. Breastmilk-saliva interactions boost innate immunity by regulating the oral microbiome in early infancy. Public Library of Science One 10, 1-19.
Altomare, A., E. Fasol, M. Colzani, X.M. Paredes Para, M. Ferrari, F. Cilurzo, C. Rumio, L. Cannizzaro, M. Carini, P.G. Righetti, and G. Aldini. 2016. An in depth proteomic analysis based on ProteoMiner, affinity chromatography and nano-HPLC-MS/MS to explain the potential health benefits of bovine colostrum. Journal of pharmaceutical and biomedical analysis 121, 297-306.
Bode. 2018. Human Milk Oligosaccharides in the Prevention of Necrotizing Enterocolitis: A Journey From in vitro and in viv Models to Mother-Infant Cohort Studies. Frontiers in Pediatrics, vol. 6 Art 385.
Anderson, J., K. McKinley, J. Onugha, P. Duazo, M. Chernoff, and E.A. Quinn. 2016. Lower levels of human milk adiponectin predict offspring weight for age: a study in a lean population of Filipinos. Maternal and Child Nutrition 12, 790-800.
Andreas, J., M.J. Hyde, C. Gale, J.R.C. Parkinson, S. Jeffries, E. Holmes, and N. Modi. 2014. Effect of Maternal Body Mass Index on Hormones in Breast Milk: A Systematic Review. Public Library of Science 9, 1-25.
Anonymous: "Human milk R&D" May 31, 2023 XP09305853.
Aragon, F., S. Carino, G. Perdigon, A. de Moreno de Leblanc. 2014. The administration of milk fermented by the probiotic Lactobacillus casei CRL 431 exerts an immunomodulatory effect against a breast tumor in a mouse model. Immunobiology 214, 457-64.
Arnold, L.D.W. 1994. Currents in human milk banking. The lactariums of France: part 1. The Lactarium of Docteur Raymond Fourcade in Marmande. Journal of human lactation 10, 125-6.
Asena, L., E.H. Suveren, G. Karabay, and D. Dursun Altenors. 2017. Human breast milk drops promote corneal epithelial wound healing. Current Eye Research 42, 506-12.
Aydn, M.S, Yiğit, E.N., Vatandaşlar, E., Erdoğan, E., and G. Öztürk. 2018. Transfer and Integration of Breast Milk Stem Cells to the Brain of Suckling Pups. Scientific Reports 8, 9 pgs.
Balaban, M.O., A.G. Arreola, M. Marshall, A. Peplow, C.I. Wei, and J. Cornell. 1991. Inactivation of pectinesterase in orange juice by supercritical carbon dioxide. Journal of Food Science 56, 743-746.
Ballard, O. and A.L. Morrow. 2013. Human milk composition: nutrients and bioactive factors. Pediatric Clinics of North America 60, 49-74.
Baynam, J.T., M.A. Moorman, C. Donnellan, V. Cevallos, and J.D. Keenan. 2013. Antibacterial effect of human milk for common causes of paediatric conjunctivitis. British Journal of Opthamology 97, 377-79.
Belitz, H-D., W. Grosch, and p. Schieberle. 2009. Edible fats and oils. Food Chemistry. Springer, Berlin, p. 640-669.

Bertino, E., M. Giribaldi, E.A. Cester, A. Coscia, B.M. Trapani, C. Peila, S. Arslanoglu, G.E. Moro, and L. Cavallarin. 2017. New human milk fortifiers for the preterm infant. Journal of Pediatric and Neonatal Individualized Medicine 6, p. 1-7.
Bharwani, S.K., B.F. Green, J.C. Pezzullo, S.S. Bharwani, and R. Dhanireddy. 2016. Systematic review and meta-analysis of human milk intake and retinopathy of prematurity: a significant update. Journal of Perinatology 36, 913-20.
Bode, L. 2012. Human milk oligosaccharides: every baby needs a sugar mama. Glycobiology 22, 1147-1162.
Bode, L. and E. Jantscher-Krenn. 2012. Structure-function relationships of human milk oligosaccharides. Advances in Nutrition 3, 383-91.
Bode, L., L. Kuhn, H.Y. Kim, L. Hsiao, C. Nissan, M. Sinkala, C. Kinkasa, M. Mwiya, D.M. Thea, and G.M. Aldrovandi. 2012. Human milk oligosaccharide concentration and risk of postnatal transmission of HIV through breastfeeding. American Journal of Clinical Nutrition 96, 831-39.
Bode, L., N. Contractor, D. Barile, N. Pohl, A.R. Prudden, G.J. Boons, Y.S. Jin., and S. Jennewein. 2016. Overcoming the limited availability of human milk oligosaccharides: challenges and opportunities for research and application. Nutrition Reviews 74, 635-44.
Bomfim, Vanessa S. et al.: "Human milk enriched with human milk lyophilisate for feeding very low birth weight preterm infants: A preclinical experimental study focusing on fatty acid profile", Department of Pediatrics, Children's Hospital, Riberiao Preto Medical School, University of Sao Paulo, Brazil, pp. 1-17, Sep. 25, 2018.
Bornstein, J.C. 2012. Serotonin in the gut: what does it do? Frontiers in Neuroscience 6, article 16, 1-2.
Brandao, M.C., A.P. Carmo, M.J. Bell, and V.C. Anjos. 2010. Characterization of milk by infrared spectroscopy. Revista do Instituto de Laticínios 65, 30-33.
Camilleri, M. 2001. Management of irritable bowel syndrome. Gastroenterology 120, 652-668.
Castillo-Courtade, L., S. Han, S. Lee, F.M. Mian, R. Buck, and P. Forsythe. 2015. Attenuation of food allergy symptoms following treatment with human milk oligosaccharides in a mouse model. Allergy 70, 1091-102.
Castro-Albarran, J., B.R. Aquilar-Uscanga, F. Calon, I. St-Amour, J. Solis-Pacheco, L. Saucier, and C. Ratti. 2016. Spray and Freeze Drying of Human Milk on the Retention of Immunoglobulins (IgA, IgG, IgM). Drying Technology 34, 1801-09.
Cavaletto, M., M.G. Giuffrida, and A. Conti. 2008. Milk fat globule membrane components —a proteomic approach. Advances in Experimental Medicine and Biology 606, 129-41.
Cavazos-Garduno, A., J.C. Serrano-Nino, J.R. Solis-Pacheco, J.A. Gutierrez-Padilla, O. Gonzalez-Reynoso, H.S. Garcia, and B.R. Aquilar-Uscanga. 2016. Effect of pasteurization, freeze-drying, and spray drying on the fat globule and lipid profile of human milk. Journal of Food and Nutrition Research 4, 296-302.
Cederlund, A., Y. Kai-Larsen, G. Printz, H. Yoshio, G. Alvelius, H. Lagercrantz, R. Strömberg, H. Jörnvall, G.H. Gudmundsson, and B. Agerberth. 2013. Lactose in human breast milk an inducer of innate immunity with implications for a role in intestinal homeostasis. Public Library of Science 8, 1-12.
Chelack, B.J., P.S. Morley, and D.M. Haines. 1993. Evaluation of methods for dehydration of bovine colostrum for total replacement of normal colostrum in calves. Canadian Veterinary Journal 34, 407-12.
Choi, A., G. Fusch, N. Rochow, N. Sheikh, and C. Fusch. 2015. Establishment of micromethods for macronutrient contents analysis in breast milk. Maternal and Child Nutrition 11, 761-72.
Choi, A., G. Fusch, N. Rochow, and C. Fusch. 2016. Target fortification of breast milk: predicting the final osmolality of the feeds. PLOS One, p. 1-12.
Christiansen, S. 2010. Chemical composition and nutrient profile of the low molecular weight fraction of bovine colostrum. M.S. thesis. University of Vermont. 55 pgs.
Cohen Engler, A., A. Hadash, N. Shehadeh, and G. Pillar. 2012. Breastfeeding may improve nocturnal sleep and reduce infantile colic: potential role of breast milk melatonin. European Journal of Pediatrics 171, 729-32.

(56) References Cited

OTHER PUBLICATIONS

Cohn, E.J., L.E. Strong, W.L. Hughes, D.J. Milford, J.N. Ashworth, M. Melin, and H.L. Taylor. 1946. Preparation and properties of serum and plasma proteins: a system for the preparation into fractions of protein and lipoprotein components of biological tissues and fluids. Journal of the American Chemical Society 68, 459-475.
Cohn, E.J., F.R.N. Gurd, D.N. Surgenor, B.A. Barnes, R.K. Brown, G. Derouaux, J.M. Gillespie, F.W. Kahnt, W.F. Lever, C.H. Liu, D. Mittelman, R.F. Mouton, K. Schmid, and E. Uroma. 1950. A system for the separation of the components of human blood: quantitative procedures for the separation of the protein components of human plasma. Journal of the American Chemical Society 72, 465-474.
Collins, E.B. and B.J. Hall. 1984. Growth of Bifidobacteria in milk and preparation of Bifidobacterium infantis for a dietary adjunct. Journal of Dairy Science 67, 1376-1380.
Cortez, M.V. and E.A. Soria. 2016. The effect of freeze-drying on the nutrient, polyphenol, and oxidant levels of breast milk. Breastfeeding Medicine 11, 551-554.
Craigie, J. 1954. Survival and preservation of tumors in the frozen state. Advances in Cancer Research 2, 197-228.
Oliveira, Mariana M. et al.: "Development of human milk concentrate with human milk lyophilizate for feeding very low birth weight preterm infants: A preclinical experimental study", Department of Pediatrics, Children's Hospital, Riberiao Preto Medical School, University of Sao Paulo, Brazil, pp. 1-16, Feb. 20, 2019.
Pariente, B., S. Hu, D. Bettenworth, S. Speca, P. Desreumaux, M-A. Meuwis, S. Danese, F. Rieder, and E. Louis. 2019. Treatments for Crohn's disease-associated bowel damage: a systematic review. Clinical Gastroenterology and Hepatology 17, 847-856.
Patki, S., S. Kadam, V. Chandra, and R. Bhonde. 2010. Human breast milk is a rich source of multipotent mesenchymal stem cells. Human Cell 23, 35-40.
Patki, S., U. Patki, R. Patil, S. Indumathi, P. Kaingade, A. Bulbule, A. Nikam, and A. Pishte. 2012. Comparison of the levels of the growth factors in umbilical cord serum and human milk and its clinical significance. Cytokine 59, 305-8.
Pearson, F., M.J. Johnson, A.A. Leaf. 2013. Milk osmolality: does it matter? Archives of disease in childhood—Fetal and neonatal edition, 98, 166-69.
Peel, E., Y. Cheng, J.T. Djordjevic, S. Fox, T.C. Sorrell, and K. Belov. 2016. Cathelicidins in the Tasmanian devil (Sarcophilus harrisii). Nature, Scientific Reports 6, 1-9.
Perrin, M.T., J. Festival, J., S. Starks, L. Mondeaux, E.A. Brownell, and A. Vickers. 2019. Accuracy and reliability of infrared analyzers for measuring human milk macronutrients in a milk bank setting. Current Developments in Nutrition 3, 7 pgs.
Potocki, S. 2016. Potential health benefits of sphingolipids in milk and dairy products. Mljekarstvo (Dairy) 66, 251-261.
Prentice, A. 1996. Constituents of human milk. Food and Nutrition Bulletin 17, 305-12.
Proom, H. and L.M. Hemmons. 1949. The drying and preservation of bacterial cultures. Microbiology 3, 7-18.
Raoufinia, R., A. Mota, N. Keyhanvar, F. Safari, S. Shamekhi, and J. Abdolalizadeh. 2016. Overview of albumin and its purification methods. Advanced Pharmaceutical Bulletin 6, 495-507.
Reinhardt, T.A., R.E. Sacco, B.J. Nonnecke, and J.D. Lippolis. 2013. Bovine milk proteome: quantitative changes in normal milk exosomes, milk fat globule membranes and whey proteomes resulting from Staphylococcus aureus mastitis. Journal of Proteomics 8C, 141-154.
Rigourd, V., I.D. Brahimi, S. Smii, C. Gobeaux, H. Razafimahefa, T. Hachem, M. Granier, and R. Serreau. 2016. High osmolality of fortifier human milk adding with vitamin (ADEC). Journal of Pharmacology and Clinical Research 1, 1-4.
Rohrig, C.H., S.S. Choi, and N. Baldwin. 2017. The nutritional role of free sialic acid, a human milk monosaccharide, and its application as a functional food ingredient. Critical Reviews in Food Science and Nutrition 57, 1017-1038.
Rueda, R. 2007. The role of dietary gangliosides on immunity and the prevention of infection. British Journal of Nutrition 98 Supplement 1, 68-73.
Rutala, W.A. and D.J. Weber. 2017 update. Centers for Disease Control and Prevention. Guideline for Disinfection and Sterilization in Healthcare Facilities. 161 pgs.
Ryan, J.M, G.E. Rice, and M.D. Mitchell. 2013. The role of gangliosides in brain development and the potential benefits of perinatal supplementation. Nutrition Research 33, 877-87.
Saarela, M., I. Virkajarvi, H. Alakomi, P. Sigvart-Mattila, and J. Matto. 2006. Stability and functionality of freeze-dried probiotic Bifidobacterium cells during storage in juice and milk. International Dairy Journal 16, 1477-1482.
Salcedo, J., M. Gormaz, M.C. Lopez-Mendoza, E. Nogarotto, and D. Silvestre. 2015. Human milk bacteriocidal properties: effect of lyophilization and relation to maternal factors and milk components. Journal of pediatric gastroenterology and nutrition 60, 527-32.
Salimei, E. and F. Fantuz. 2012. Equid milk for human consumption. International Dairy Journal 24, 130-142.
Sauret, A., M.C. Andro-Garcon, J. Chauvel, A. Ligneul, P. Dupas, C. Fressange-Mazda, P. Le Ruyet, and A. Dabadie. Osmolality of a fortified human preterm milk: the effect of fortifier dosage, gestational age, lactation stage, and hospital practices. Archives de Pediatrie 25, 411-15.
Schanler, R.J. 1995. Suitability of human milk for the low-birthweight infant. Clinical Perinatology 22, 207-22.
Schmid, M., F. Guiheneuf, D.B. Stengel. 2016. Evaluation of food grade solvents for lipid extraction and impact of storage temperature on fatty acid composition of edible seaweeds *Laminaria digitate* (*Phaeophyceae*) and *Pamaria palmate* (*Rhodophyta*). Food Chemistry 208, 161-168.
Serhan, C.N., S. Krishnamoorthy, A. Recchiuti, and N. Chiang. 2011. Novel anti-inflammatory-pro-resolving mediators and their receptors. Current Topics in Medicinal Chemistry 11, 629-47.
Silvestre, D. 2015. Freeze-drying breast milk retains more of its healthy properties. Journal of pediatric gastroenterology and nutrition. Medicalexpress.com/news.
Singh, I., A.K. Rehni, R. Kalra, G. Joshi, M. Kumar, and H.Y. Aboul-Enein. 2007. Ion exchange resins: drug delivery and therapeutic applications. Journal of Pharmaceutical Science 32, 91-100.
Singh, P., A. Thakur, S. Dogra, G. Pankaj, L.M. Srivastav, and N. Kler. 2017. Comparison of osmolality of human milk after fortification with three different fortifiers. Current Medicine Research and Practice 7.
Smith, L.W. and P.W. Emerson. 1924. Notes on the experimental production of dried breast milk. Boston Medical and Surgical Journal 191, 938-40.
Srinivasan, L., R. Bokiniec, C. King, G. Weaver, and A.D. Edwards. 2004. Increased osmolality of breast milk with therapeutic additives. Archives of Disease in Childhood. Fetal and Neonatal Edition 89, F514-F517.
Stefanov, I., et al.: "A novel procedure for routine milk fat extraction based on dichloromethane", Journal of Food Composition and Analysis, Elsevier Ltd., Belgium, vol. 23, 2010, pp. 852-855.
Stamp, L. 1947. The preservation of bacteria by drying. Microbiology 1, 251-265.
Sun, H., S. Han, R. Cheng, M. Hei, F. Kakulas, and S. K. Lee. 2019. Testing the feasibility and safety of feeding preterm infants fresh mother's own milk in the NICU: a pilot study. Nature, Scientific Reports 9, 1-9.
Suranyi, J., G. Wohlmuth, and G. Szakmary. 1960. Manufacture, quality control and use of freeze-dried human milk. Acta Pediatrica Academiae Scientiarum Hungaricae 1, 131-42.
Svensson, M., C. Duringer, O. Hallgren, A.K. Mossberg, A. Hakansson, S. Linse, and C. Svanborg. 2002. Hamlet—a complex from human milk that induces apoptosis in tumor cells but spares healthy cells. Advances in experimental medicine and biology 503, 125-132.
Swanson, K.W. 2009. Human milk as technology and technologies of human milk: medical imaginings in the early twentieth century United States. WSQ: Women's Studies Quarterly 37, 1 & 2, 20-37.

(56) References Cited

OTHER PUBLICATIONS

Tack, J., M. Fried, L.A. Houghton, J. Spicak, and G. Fisher. 2006. Alimentary Pharmacology and Therapeutics 24, 183-205.

Talbot, F.B. 1911. Two methods of obtaining milk for hospital use. Boston Medical and Surgical Journal, 164, 304-6.

Thoene, M., C. Hanson, E. Lyden, L. Dugick, L. Ruybal, and A. Anderson-Berry. 2014. Comparison of the effect of two human milk fortifiers on clinical outcomes in premature infants. Nutrients, 261-75.

Van Herwijnen, M.J., M.I. Zonneveld, S. Goerdayal, E.N. Nolte-'t Hoen, J. Garssen, B. Stahl, A.F. Maarten Altelaar, F.A. Redegeld, and M.H. Wauben. 2016. Comprehensive proteomic analysis of human milk-derived extracellular vesicles unveils a novel functional proteome distinct from other milk components. Molecular and Cellular Proteomics 15, 3412-3423.

Van Wettere, W.H.E.J., N.L. Willson, S.J. Pain, and R.E.A. Forder. 2016. Effect of oral polyamine supplementation pre-weaning on piglet growth and intestinal characteristics. Animal Journal. Oct. 1, 1-5.

Vincenzetti, S., M. Savini, C. Cecchini, D. Micozzi, F.M.Carpi, A. Vita, and P. Polidori. 2011. Effects of lyophilization and use of probiotics on donkey's milk nutritional characteristics. International Journal of Food Engineering 7, 1-14.

Wang, B., P. McVeagh, P. Petocz, and J. Brand-Miller. 2003. Brain ganglioside and glycoprotein sialic acid in breastfed compared with formula-fed infants. American Journal of Clinical Nutrition. 78, 1024-29.

Weiss G.A., H. Troxler, G. Klinke, D. Rogler, C. Braegger and M. Hersberger. 2013. High levels of anti-inflammatory and pro-resolving lipid mediators, lipoxins, and resolvins and declining docosahexaenoic acid levels in human milk during the first month of lactation. Lipids in Health and Disease 12, 1-12.

Wierzbicki, A., M.S. Taylor, C.A. Knight, J.D. Madura, J.P. Harrington, and C.S. Sikes. Analysis of Shorthorn Sculpin antifreeze protein stereospecific binding to (2-10) faces of ice. Biophysical Journal 71, 8-18.

Williams, F. 2012. The impressive power of breast milk. Discover Magazine. Jun. 2012, 1-4.

Woo J.G., M.L. Guerrero, F. Guo, L.J. Martin, B.S. Davidson, H. Ortega, G.M. Ruiz-Palacios, and A.L. Morrow. 2012. Human milk adiponectin affects infant weight trajectory during the second year of life. Journal of Pediatric Gastroenterology and Nutrition 54, 532-539.

Yoneme, H., J. Hatakeyama, A. Dano, H. Oida, M. Yoshinari, R. Aijima, J. Murata, T. Watanabe, Y. Oki, and M.A. Kido. 2015. Milk basic protein supplementation enhances fracture healing in mice. Nutrition 31, 399-405.

Young, W.H. and K.R. Sutherland. 1922. The design of a machine to powder milk. B.S. thesis, Massachusetts Institute of Technology.

Yoshimura, T., M. Shimoda, H. Ishikawa, M. Miyaki, K. Matsumoto, Y. Osajima, and I. Hayakawa. 2002. Effect of $CO_2$ flow rate on enzyme inactivation by continuous method with microbubbles of supercritical carbon dioxide. Journal of the Faculty of Agriculture Kyushu University 46, 345-352.

Yu, Y., S. Mishra, X. Song, Y. Lasanajak, K.C. Bradley, M.M. Tappert, G.M. Air, D.A. Steinhauer, S. Halder, S. Cotmore, P. Tattersall, M. Agbandje-McKenna, R.D. Cummings, and D.F. Smith. 2012. Functional glycomic analysis of human milk glycans reveals the presence of virus receptors and embryonic stem cell biomarkers. Journal of Biological Chemistry 287, 44784-99.

Office Action dated Feb. 22, 2024 (Corresponding Canadian Application No. 3,146,184).

Office Action dated Mar. 5, 2024 (Corresponding Canadian Application No. 3,130,834).

* cited by examiner

Figure 1. Density of CO2 versus temp and pressure

Sample 1: Lyophilized, whole human milk at pH 4. Sample 2: Lyophilized, whole human milk at pH 4 plus addition of ethanol at 50/50 weight %. Sample 3: Protein-carbohydrate fraction of lyophilized human milk at pH 4 in water plus ethanol at 50/50% by weight ethanol. Sample 4. Protein carbohydrate fraction of human milk at pH 4 in distilled water

Sample 1: lyophilized whole human milk. Sample 2: protein-carbohydrate fraction of lyophilized whole human milk.

Results of protein, carbohydrates, and milk oil (fats) fractions of lyophilized human milk: FTIR measurements of macronutrients, grams per 100 grams

| Number | Treatment | Protein | Carbohydrates | Milk oils (fats) | prot/carb |
|---|---|---|---|---|---|
| 1 | 4,000 psi, 60C, 90 min: pH 4 supernatant | 20 | 57 | 23 | 0.35 |
| 2 | 4,000 psi, 60C, 90 min: pH 4 pellet, 1st wash | 28 | 25 | 47 | 1.12 |
| 3 | 4,000 psi 60C, 90 min: pH 4 pellet, 2nd wash | 56 | 44 | 0.1 | 1.27 |
| 4 | 4,000 psi,60C, water/EtOH 50/50 upper layer | 8 | 88 | 3 | 0.09 |
| 5 | 4,000 psi, 60 C, water/EtOH50/50 pellet | 28 | 61 | 11 | 0.46 |
| 6 | 4000 psi, 60C, ppt as above washed 3 times | 88 | 13 | negligible | 7.33 |
| 7 | Protein-carb fraction 3000 psi, 60C, 90 min. | 14 | 81 | 5 | 0.17 |
| 8 | Lyophilized Human whole milk | 10 | 68 | 22 | 0.15 |

FIG. 4

FORTIFIED MILK COMPOSITIONS AND THEIR PROCESSES OF PREPARATION

CROSS-REFERENCE TO RELATED APPLICATIONS

This is the U.S. National Phase Application under 35 U.S.C. 371 of International Application No. PCT/CA2020/050235, filed Feb. 24, 2020, which claims priority to U.S. Provisional Application No. 62/809,119, filed Feb. 22, 2019. The foregoing applications are incorporated by reference herein in their entirety.

FIELD OF INVENTION

The present invention pertains to fortified milk compositions and methods for preparing same, in particular fortified human milk compositions made from human milk.

BACKGROUND

Human milk is well established and widely recognized as the best source of nutrition for growth and well-being of babies. There is a voluminous literature about human milk, including a number of thorough reviews (e.g., Prentice, 1996; Ballard and Morrow, 2013; Medo et al., 2013).

It is also recognized that premature infants, with only partial development at best of virtually all of their organ systems, need special attention to their nutrition to achieve steady and optimal early growth toward a healthy infancy. In other words, mother's milk alone often is insufficient to their nutritional needs (Davies et al., 1997; Adamkin and Radmacher, 2014; Li et al., 2016; Abrams et al., American Academy of Pediatrics, 2017; Bertino et al. 2017; Koo and Tice, 2018).

For these reasons, especially in neonatal units of hospitals, babies are fed fortified formulas of human milk. In these formulas, the emphasis is on levels of protein that are provided at elevated amounts that better fill the needs of the infants. Protein is typically increased to about 3 grams per 100 ml. For comparison, whole mother's milk—unfortified—contains only about 1 gram of protein per 100 ml.

Fats typically fall within a range of roughly 4 grams per 100 ml of human milk, with carbohydrates at around 7 grams per 100 milliliters. In fortified milk formulas, fats and carbohydrates are typically held to approximately to these levels. Fats overall are regarded as potentially not helpful if levels are elevated too much. Carbohydrate levels do not attract the same concerns, but they are kept under control as well in the fortified formulas.

Macronutrients: Studies sponsored by the FDA resulted in recommendations about the composition of milk formulas (Food and Drug Administration. 21 CFR Part 107. Infant formula. Volume 80, 120, p. 35834-35841, Jun. 23, 2015; updated Apr. 1, 2018, see eCFR www.ecfr.gov). At the time, the focus was on formulas comprised of bovine milk, but the recommendations are applicable to human milk formulas. The recommended levels of protein and fat were (minimum/maximum grams per 100 calories of formula): protein—1.8 to 4.5 g/100 cal; fat—3.3 to 6.0 g/100 cal.

The upper and lower limits of carbohydrates were not specified, but are meant to be an amount in keeping with the recommended energy provision at present of 100 calories when added to the levels of proteins and fats. In general, there are roughly 4 calories per gram of carbohydrates and thus the amount of carbohydrates to provide 100 calories of formula would be in the range of 7 grams, again depending on the amounts of proteins and fats.

Two other components of fortified human milk that receive careful attention are 1) inclusion of health-promoting vitamins and minerals and 2) osmolality of the fortified formulation.

Vitamins and minerals: The FDA has also issued guidelines as above for the inclusion of vitamins and minerals in milk formulas. Although the list of these is lengthy and the units for designating dosages are somewhat variable and complicated, providing the desired mixture in appropriate amounts to a milk formula is straightforward. That is, in practice, an order for a list of vitamins and minerals in designated amounts can be filled by a variety of commercial sources. This resource can be added as a supplement to the 3 essential fractions of proteins, fats, and carbohydrates to complete a fortified milk formula.

Notation about Cellular Components: In addition to nutrients, vitamins, minerals, and the multitude of beneficial molecules in human milk, there is a cellular population of whole milk. This is comprised mainly of beneficial maternal cells such as lymphocytes, leucocytes, macrophages, and neutrophils.

There is even a robust population of pluripotent stem cells whose contributions to infant development and well-being are thought to be many-fold (Hassiotou et al, 2012; Ayden et al. 2018). If provided by direct nursing to an infant, these cells can survive and migrate from the digestive tract of infants, enter the blood stream, and find their way to various organs including the brain. Here they can differentiate into the appropriate cell types and function as integral parts of the body. They may persist throughout life. However, stem cells do not live long after the milk is freshly expressed by the woman and are not contemplated as part of the fortified human milk compositions of the present invention.

Probiotics: Also resident in human milk are health-promoting bacteria such as *Bifidobacterium* and *Lactobacillus*, which are identified as useful probiotics. As in the case of fortifying human milk in particular with proteins, vitamins, and minerals, there are studies that demonstrate the benefits of probiotic supplements. For example, the addition of *Bifidobacterium* to human milk is exemplified in US patents and patent applications (e.g., U.S. Pat. No. 8,197,872 to Mills et al., 2012; U.S. Pat. No. 9,808,474 to Buck et al., 2017; U.S. Pat. No. 9,808,475 to German et al., 2017; U.S. patent application Ser. No. 15/521,502 by Kyle et al., 2017).

C-section babies: Contemplated therein are benefits regarding establishment of healthy gut flora in premature infants, as well as all infants delivered by C-section. All of these infants are at risk of digestive tract infection and impairment. In the USA, late preterm (34-36 weeks) deliveries occur in over 7% of births, with early preterm births (less than 34 weeks) at 2.75% in 2018. Over 30% of infants are delivered by Cesarean section (Martin et al., 2019).

Digestive tract issues occur if there is a lack of *Bifidobacterium* and its ability to digest and process milk oligosaccharides that block attachment and proliferation of harmful bacterial and viral pathogens in these new-born babies. Early preterm infants are most at risk, of course, having even more incomplete development of their organ systems.

But those infants delivered by C-section may be at risk as well, even if delivered full-term, apparently not having received the proper inoculation of their digestive tracts that accompanies a vaginal delivery. Hence, these babies can also benefit from a probiotic supplement in mother's milk (see also, Sangild, U.S. patent application Ser. Nos. 15/036,854 and 15/036,855, 2016).

The workers in this field do not stop there, however, also contemplating Bifidobacterial supplements to other types of milk as well. Contemplated are supplemented milk not only for all human infants, but also for farm animals, pets, and basically any mammalian animal that may be provided care by humans.

Other workers contemplate benefits to brain development pursuant to infants feeding on supplemented human milk with probiotics including Lactobacterium and *Bifidobacterium* (U.S. Pat. No. 9,609,888 to Berg et al., 2017; US patent applications, Chichlowski and Berg, 2018 a,b). Emphasis in this work was on the salutary effects related to ganglioside production, as well as enhancement of the immune response, antimicrobial effects, and proper development of the digestive tract.

Another utility of probiotic supplemented human milk is reported to be production of anti-inflammatory peptides (U.S. Pat. No. 9,457,058 to Hondmann et al, 2016). Both adult and pediatric populations were also considered for the benefits of the instant formulas, with specific discussion of reduction of the inflammatory response during diseases of neonatal infants and children in general. Anti-inflammatory action of probiotic supplement to human milk through other mediated reactions of the beneficial bacteria with various biochemical components including long-chain fatty acids and oligosaccharides along with specific proteins was also taught by Rosales et al., U.S. Pat. No. 9,439,448 (2016). Such supplements were again contemplated for use not only in promoting health of premature infants, but also children and adults as well.

Safe supplies of probiotics, free of other microbes, are available from a variety of sources. These may be accessed if desired for use in accord with the present invention.

Osmolality: Adjustment of the osmolality of the liquid milk formula is another feature that may be need some attention. The osmolality (defined as moles of solute per kilogram of solution) is a function of the molar amounts of soluble ions and dissolved molecules in the aqueous portion of the milk, assigned in this case as moles of these solutes per kilogram of milk. For clarity, osmolarity is defined as moles of solute per liter of solution. The terms osmolality and osmolarity are nearly interchangeable in many cases, but they are not the same.

Of importance in milk, molecules of high molecular weight that may be emulsified rather than solubilized, or molecules that are not water soluble, would not contribute to osmolality. This is the case of much of the protein and fat fractions. Therefore, most of the osmolality is contributed by the soluble, low molecular weight carbohydrates (e.g., lactose) and, of course, by the soluble ions like sodium, chloride, calcium, phosphate, and the like.

Again, in the guidelines above, the FDA has issued a rule for the minimum and maximum levels of a selection of soluble mineral components of milk formulas. However, there is no statement about osmolality as such.

The current state of the professional literature about the effects of osmolality on health of premature infants is not very extensive and is unclear to some extent (Pearson et al., 2013, Singh et al., 2017). There are suggestions that higher osmolality of fortified milk can harm an infant's digestive tract, lead to infections, and even to life-threatening conditions. Suppliers of human milk fortifiers are aware of this and are able to keep the osmolalities and recommended uses of their products within a safe range (De Curtis et al., 1999; Janjindamai and Chotsampancharoen, 2006; Sauret et al., 2018).

However, rather than owing to the natural content of human milk, there are other reports that in the cases of hyperosmotic-related pathologies, it was the doses of antibiotics, vitamins, and medicines that led to significantly elevated osmolalities in the fluids being provided to the distressed infants (Srinivisan et al., 2004; Rigourd et al., 2016).

Although not well understood, this is a serious issue such that producers of milk formulas and providers of milk to hospitals have adopted cautionary standards for osmolality in milk for infants. The current voluntary guideline is 400 milli-osmoles per kilogram (mOsm), which is supported by the American Academy of Pediatrics (Abrams et al., 2017), hospitals and other customers of infant formulas. Other studies support an upper limit of 600 mOsm per kilogram of formula (Hossain et al., 2014) with an understanding that upwards of 1,000 mOsm per kilogram is likely still a safe level. This conclusion was also made by Choi et al. (2016) in a thorough review and analysis of the contributing factors. As a point of comparison, an earlier study (Schanler, 1995) had shown that the osmolality of the preterm gastrointestinal tract itself is approximately 600 mOsm.

Patents. Fortifiers for addition to human milk historically were made from bovine milk feedstock and other non-human sources of the main components. For example, there are well-known products having tradenames of Similac (Abbott Laboratories) and Enfamil (Mead Johnson and Company) that exemplify this type of offering (Barrett-Reis et al., U.S. Pat. No. 6,472,003, 2002; Euber et al., U.S. Pat. No. 8,147,894, 2012; Rosales et al., U.S. Pat. Nos. 8,287, 931 and 9,439,448, 2012 and 2016; Thoene et al., 2014).

More recently, human milk fortifiers made from human-milk feedstock have become available (Medo et al., U.S. Pat. No. 8,545,920, 2013; Fournell et al., U.S. Pat. No. 8,927, 027, 2015 and U.S. patent application Ser. No. 15/726,232, 2018). These fortifiers provide biochemical isolates of human milk that are prepared via standard biochemical methods such as ultrafiltration, reverse osmosis and high-performance, liquid chromatography. Included are isolates of the permeate fraction that are enriched in milk oligosaccharides—and likely other beneficial, small molecules such as peptides—that were at first believed to be concentrated in the retentate fraction. These oligosaccharides are potentially valuable to infants regarding development of healthy digestive tracts, and exhibiting other desirable features as well such as anti-inflammatory activity and promotion of immunity.

Presently known methods/processes for preparing milk fortifying components involving advanced biochemical and engineering treatments of liquid milk, such as ultrafiltration, reverse osmosis, centrifugation, and a variety of high-performance chromatographic techniques, result in losses of various desirable compounds.

Therefore, there is a need for simple and improved methods of isolating desired fractions from milk, while conserving its health promoting components/constituents.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide methods for the preparation of fortified milk using dried or lyophilized milk as feedstock.

Another object of the present invention is to extract and isolate a fats-enriched fraction, a protein-enriched fraction, and/or a carbohydrate-enriched fraction from dry whole milk.

In accordance with an aspect of the present invention, there is provided a process for converting dried whole mammalian milk into a fats-enriched fraction, a protein-enriched fraction, and a carbohydrate-enriched fraction, the process comprising the steps of: a) treating the dry milk with a fats extracting agent to provide a fats-enriched fraction, and a residual fraction comprising proteins and carbohydrates; b) separating said fats-enriched fraction from the residual fraction; and c) removing the fats extracting agent from the separated fats-enriched fraction to produce a dry fraction of oily, fats-enriched material and a fraction enriched in proteins and carbohydrates.

In accordance with another aspect of the invention, there is provided a fats-enriched fraction, a protein-enriched fraction, and/or a carbohydrate-enriched fraction isolated from the dry whole milk by the process described herein.

In accordance with another aspect of the invention, there is provided a composition comprising one or more of the fractions isolated from the dry whole milk by the process described herein.

In accordance with another aspect, the present invention provides use of one or more of the fat-enriched fraction, protein-enriched fraction, and/or carbohydrate-enriched fractions obtained by the process described herein for mixing with human or bovine milk or water to produce a fortified milk composition.

Another object of the present invention is to provide a premixed, liquid form of fortified human milk or bovine milk, ready-to-feed to human infants.

Another object of the present invention is to supplement the fortified milk with vitamins and minerals.

Another object of the present invention is to supplement the fortified milk with probiotics.

Another object of the present invention is to maintain the osmolality of the fortified milk at a health-sustaining level in the range of 300 milliosmoles to 1000 milliosmoles per kg.

Another object of the present invention is to use bovine and other animal milks as feedstocks for production of fortified milk for feeding new-borne or young farm animals and domestic animals like cows, horses, and dogs.

Numerous other features, objects and advantages of the invention will become apparent from the following description when read in conjunction with the accompanying figures.

BRIEF DESCRIPTION OF THE FIGURES

FIG. 4 illustrates results of protein, carbohydrates, and milk oil (fats) fractions of lyophilized human milk in representative experiments as measured by FTIR.

DETAILED DESCRIPTION OF THE INVENTION

Definitions

Figure 1:
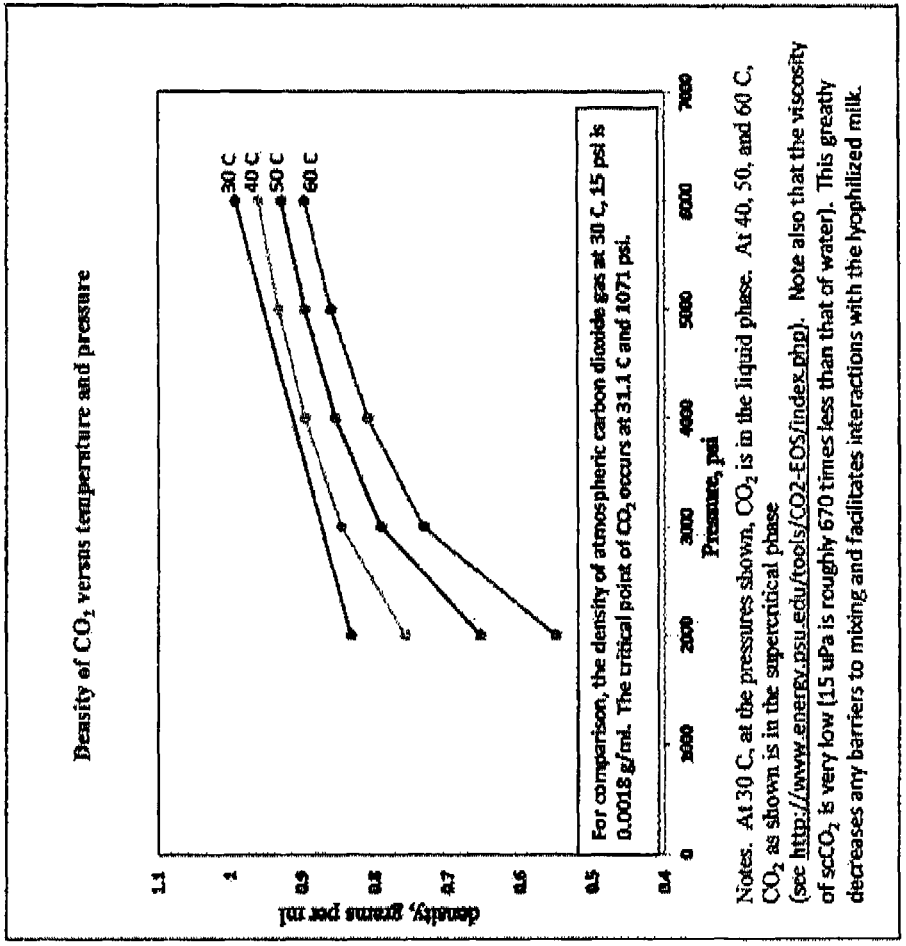
FIG. 1 illustrates density of $CO_2$ versus temperature and pressure.

Unless defined otherwise, all technical and scientific terms used herein have the same meaning as commonly understood by one of ordinary skill in the art to which this invention belongs.

As used herein, the term "about" refers to approximately a +/−10% variation from a given value. It is to be understood that such a variation is always included in any given value provided herein, whether or not it is specifically referred to.

The term "mildly acidic" used in the context of the present invention mean a solution having a pH of about 2.5 to about 5, preferably, the pH of the mildly acidic solution is from 3 to 4.8.

The terms "freeze dried" and "lyophilized" have been used interchangeably in the present application, which mean a substance dried via a low temperature dehydration process that involves freezing the product, lowering the pressure, then removing the ice by sublimation.

The present invention provides novel methods for preparation of fortified mammalian milk, in particular bovine and human milk (for feeding infants), wherein a dried form of mammalian milk is used as feedstock. The present invention also provides novel compositions of fortified milk based on blends of fractions of milk obtained from dried or lyophilized whole milk as feedstock.

Non limiting examples of mammalian milk used in the context of the present invention are bovine milk, sheep milk, goat milk, camel milk, buffalo milk, and human milk.

The present invention also provides for a process to extract and isolate the fatty acid, lipids, and fat-soluble components from the dry powder of milk by simple and benign methods, yielding a fraction enriched in fats as an oily isolate, and/or to isolate the proteins of milk by other simple and benign methods involving aqueous treatments and precipitation, yielding a fraction enriched in proteins.

The extraction process of the present invention involves converting dried whole/mother's milk into a fats-enriched fraction, a protein-enriched fraction, and a carbohydrate-enriched fraction. The process comprises the steps of a) treating the dry milk with a fats extracting agent to provide a fats-enriched fraction, and a residual fraction comprising proteins and carbohydrates, b) separating said fats-enriched fraction from the residual fraction, and c) removing the fats extracting agent from the separated fats-enriched fraction to produce a dry fraction of oily, fats-enriched material and a fraction enriched in proteins and carbohydrates.

The process can involve human milk, bovine milk or other mammalian milk. The preferred milk is human milk, freshly expressed and quickly frozen.

The dried milk can be freeze-dried/lyophilized milk, spray-dried, or forced-air dried milk. Preferably, the milk is freeze dried/lyophilized. By using dried-milk as the feedstock in the extraction process, the components of the many thousands of health-promoting constituents of milk are conserved almost in their entirety, including each of the 3 macro-components of protein, fats, and carbohydrates.

There are significant advantages to use the dried form of milk, preferably lyophilized milk relative to liquid milk as feedstock for production of human milk fortifiers.

For one thing, as a dry powder, the human milk is more readily processed for isolation and production of the macro-components via simple and benign methods. These methods permit quantitative recovery of milk components. This leads to maximal utility of another significant feature, namely that lyophilization conserves essentially all of the multitude of beneficial molecules of human milk.

In some embodiments, the lyophilized human milk is comprised of cream-colored to white flakes that contain essentially all of the components of fresh human milk. It retains essentially all of the nutritional and health attributes of fresh, whole human milk. It is a purified, dry powdery material The fresh and/or the frozen milk is first certified as safe by analytical screening for undesirable and potentially harmful drugs, microbes, and non-milk diluents (such as plant "milks") prior to fractionation. Milk that does not pass the safety screens and human-authenticity tests is rejected and not included in further processing.

The fats extracting agent of step a) can be supercritical carbon dioxide, or a fats solubilizing solvent. Non limiting examples of fats solubilizing solvents are ethanol, ethyl acetate, butanol, hexane or a combination thereof, as disclosed in Cohn et al., 1946, 1950; Denizil, 2011; Raoufinia et al., 2016.

In some embodiments, when the fats extracting agent is supercritical carbon dioxide, step a) is carried out at a pressure range of 2500-4500 psi, and temperature range of 40 to 75° C.

In some embodiments, when the fats extracting agent of step a) is a fat solubilizing solvent, then step c) of the process further comprises drying the fats enriched fraction to produce the dry fraction of oily, fats-enriched material.

In some embodiments, the process further comprises treating the proteins and carbohydrates enriched fraction obtained in step c) with:
 i. a mildly acidic aqueous solution, optionally supplemented with an organic solvent, or
 ii. a water and an organic solvent mixture, or
 iii. carbonated water having a pH as low as pH 3,
to provide a precipitated protein-enriched fraction, and a soluble carbohydrate-enriched supernatant fraction. The soluble carbohydrate-enriched supernatant fraction is then separated from the protein-enriched fraction, and the protein-enriched fraction is dried.

In some embodiments, the organic solvent used in the above described treatment step is an alcohol solvent, preferably ethanol.

In some embodiments, the mildly acidic aqueous solution can be obtained by adding $CO_2$ gas, liquid $CO_2$ or supercritical $CO_2$ to water, preferably by sparging or micro bubbling $CO_2$ gas or supercritical $CO_2$ into water. In such embodiments, upon drying of the protein-enriched fraction $CO_2$ is evacuated to the atmosphere, rendering these materials pH neutral.

In some embodiments, the mildly acidic aqueous solution is obtained by adding one or more inorganic acids and/or organic acids to water. Non limiting examples of inorganic acids include $H_2CO_3$, HCl, $H_2SO_4$, $H_3PO_4$, $HNO_3$, and combinations thereof, preferably, HCl. Non limiting examples of organic acids include acetic acid, citric acid, or a combination thereof. In such embodiments, the protein-enriched precipitates are separated from the soluble carbohydrate-enriched supernatant fraction by filtration or centrifugation (preferably by centrifugation), to isolate the protein-enriched fraction. The protein-enriched fraction can then be dried by lyophilization, or by drying under conditions of forced air at 80° C. or less, preferably at about 60° C. If desired, the pH of the separated carbohydrate-enriched supernatant fraction is restored to neutrality, by using common bases such as NaOH, KOH, or ammonia.

In some embodiments, the proteins and carbohydrates enriched fraction obtained in step c) is dried before subjecting this fraction to the treatment step described in the preceding paragraphs.

The soluble carbohydrate-enriched supernatant fraction may be used as-is in subsequent steps. Alternatively, it may itself be lyophilized or otherwise dried to yield a dry, carbohydrate-enriched powdered fraction of milk. There are also approaches that employ pH and solvent transients, along with heating, for precipitating carbohydrates from the aqueous phase.

In some embodiments, the remaining carbohydrate-enriched supernatant fraction of milk is provided for use as an aqueous fluid to which the concentrates of milk fats and dried protein may be added in desired amounts.

The aqueous carbohydrate-enriched supernatant fraction contains the components that largely contribute to osmolality—namely the low-molecular-weight carbohydrates which are present in large amounts and to a lesser extent the inorganic salts which are present but not so prevalent.

The salts are ionic whereas the carbohydrates are neutrally charged. Therefore, the dissolved salts can be removed or their levels reduced as needed by a simple ion-exchange treatment, analogous to those commonly used in homes for ultra-purification of drinking water. In this approach, insoluble beads of mixed ion-exchange resin are added to the fluid in the appropriate stoichiometric amounts for removing or decreasing the amounts of both the soluble anions and cations. Alternatively, the carbohydrate-enriched fluid can be deionized by flowing over a bed of mixed ion-exchange materials.

In some embodiments, the separated carbohydrate-enriched supernatant fraction is dried to render the carbohydrate fraction of milk as a dry powder for blending with the fractions of milk fats and proteins as a dry formula for mixing with mother's milk for feeding to infants. The carbohydrate-enriched supernatant fraction can be dried by lyophilization or under conditions of forced air at 80° C. or less, preferably at about 60° C., In some embodiments, the process further comprises a step of adjusting the pH of the soluble carbohydrate-enriched supernatant fraction to precipitate a solid carbohydrate-enriched fraction, which is separated and optionally dried. This step may optionally further include adding a solvent before, during and/or after the pH adjustment step. The solvent can be an alcohol solvent, such as ethanol. In some embodiments, the pH adjusting step further comprises heating the soluble carbohydrate-enriched fraction at 90° C. or higher.

In some embodiments of the processes described just above, the pH of the soluble carbohydrate-enriched fraction is adjusted to pH 10 to 11. In some embodiments, the pH of the soluble carbohydrate-enriched fraction is first adjusted to be in a range of pH 10 to 11, heated, and then readjusted to be in a range of 3 to 4.8.

In some embodiments of the processes described herein, the pH is adjusted by use of one or more of bases elected from the group consisting of $NH_4OH$, NaOH, KOH, gaseous $NH_3$, or an alkanolamine, such as methanolamine and ethanolamine. In this step, $NH_4OH$ or gaseous $NH_3$ are preferred for use because, as gases dissolved in water, they are readily evacuated to the atmosphere, or converted to vapor phase, then collected, during the drying step.

In another aspect of the present invention, there is provided a fats-enriched fraction obtained by the processes herein.

In another aspect of the present invention, there is provided protein-enriched fraction obtained by the processes herein.

In another aspect of the present invention, there is provided carbohydrate-enriched fraction obtained by the processes herein.

In another aspect of the present invention, there is provided a composition comprising one or more of the fractions obtained by the processes herein.

In another aspect of the present invention, there is provided use of one or more of the fat-enriched, protein-enriched, and carbohydrate-enriched fractions obtained by the processes described herein, in appropriate amounts for mixing with a whole or skimmed mammalian milk (preferably bovine milk, goat milk, sheep milk or human milk) or water to produce a fortified milk composition.

In another aspect of the present invention, there is provided a composition comprising the aqueous carbohydrate-enriched fraction, dry fat-enriched fraction, and dry protein-enriched fraction, obtained by the processes described herein, for addition in appropriate amounts to a whole or skimmed mammalian milk (preferably bovine milk, goat milk, sheep milk or human milk) or water to produce a fortified milk composition.

In another aspect of the present invention, there is provided a blend of one or more of the dry fat-enriched fraction, dry protein-enriched fraction, and dry carbohydrate-enriched fraction obtained by the processes described herein, in appropriate amounts as a dry material for mixing with a whole or skimmed mammalian milk (preferably bovine milk, goat milk, sheep milk, or human milk) or water to produce a fortified milk composition.

In another aspect of the present invention, there is provided an aqueous concentrate comprising one or more of the fractions obtained by the processes described herein, for mixing with a mammalian milk (preferably bovine milk, goat milk, sheep milk, or human milk) or water to produce a fortified milk composition.

In another aspect of the present invention, there is provided an aqueous concentrate comprising the aqueous carbohydrate-enriched fraction, the dry fat-enriched fraction, and the dry protein-enriched fraction, obtained by the processes described herein, for mixing with a whole or skimmed mammalian milk (preferably bovine milk, goat milk, sheep milk or human milk) or water to produce a fortified milk composition.

In another aspect of the present invention, there is provided a method of fortifying a whole or skimmed mammalian milk (preferably bovine milk, goat milk, sheep milk or human milk) comprising mixing one or more of the fractions obtained by the processes described herein. In some embodiments, the method further comprises adding vitamins and minerals. In some embodiments, the method further comprises adding probiotics as a supplement.

In another aspect of the present invention, there is provided a fortified milk composition comprising one or more of the fractions obtained by the processes described herein. In some embodiments, the fortified milk comprises 10 to 85 mg/ml of protein, 60 to 125 mg/ml of carbohydrates, and 38 to 105 mg/ml of fats. In some embodiments, the fortified milk has a caloric content of 20 to 26 calories per ounce.

In some embodiments, the fortified milk has an osmolality in the range of 300 to 1000 milliosmoles (mOsm), preferably in the range of 300 to 600 milliosmoles per kg.

In another aspect of the present invention, there is provided use of one or more of the fractions obtained by the processes described herein, as supplements to bovine or other mammalian milk.

In another aspect of the present invention, there is provided use of one or more of the fractions obtained by the processes described herein, as supplements to human milk.

In one embodiment of the present invention, the protein-enriched fraction and the fat-enriched fraction are combined appropriately with the aqueous carbohydrate phase, along with more water if needed, to produce a reconstituted human milk formula having desired or recommended levels of proteins, fats, and carbohydrates, as well as an enriched supply of the full complement of the many thousands of beneficial components of whole human milk.

In another embodiment of the present invention, one or more of the fats-enriched fraction, carbohydrate-enriched fraction, and the protein enriched fraction may be added to freshly expressed human milk or freshly thawed frozen human milk as needed or desired.

In another embodiment of the present invention, the milk may be further supplemented with a formulation of select vitamins and minerals, either in dry or liquid forms.

In another embodiment of the present invention, the reconstituted, fortified, and supplemented human milk may then be homogenized, pasteurized, or both. Pasteurization or retorting may be conducted as part of a packaging process.

In another embodiment of the present invention, a shelf-stable product of fortified human milk, ready-to-feed to babies is produced.

In another embodiment of the present invention, vials, syringes, or packets are produced containing blends of the isolated components of human milk, as well as vitamins and minerals, as combined concentrates ("fortifiers") in aqueous or powdered forms. These fortifiers are appropriately prepared for adding to mothers' milk at the hospitals or homes for provision of enriched levels of proteins, fats, carbohydrates, and many other beneficial components.

In another embodiment of the present invention, the fortified human milk is further treated to adjust its osmolality into a preferred range.

Experimental Protocols and Methods

Human-Milk Supply Chain and Safety Screening

Freshly expressed human milk was collected into containers, typically 4 ounces each, provided to participant mothers by a company that deals in mother's milk. The milk is stored at approximately −20° C. for up to 1 month while a sufficient number of containers are accumulated (typically 40, 4 oz. containers), then sent still-frozen in specialty packaging provided for that purpose to the company's storage and analytical facilities.

Samples of milk were cold-thawed (e.g., at room temperature) and subsamples taken for screening purposes. Alternatively, the container coverings are removed and the milk, still mostly frozen, is combined into larger vessels, typically 5 gallon pails or 3 gallon trays, and fully re-frozen to make an integrated frozen block. These are then subsampled by coring or shaving cryo-methods for screening purposes so that the bulk of the milk remains frozen prior to lyophilization.

Screening includes microbiological assessments via standard culture techniques. Presences of both beneficial and potential pathogenic microbes are quantified. Assays by microbiological plate kits (3M petrifilms) include counts of aerobics, *E. coli*, yeast, mold, and *Staphylococcus aureus*.

Molecular detection (3M MDS kits) are also used to screen for *Salmonella, Listeria*, and *Cronobacter*.

Detection of Presence or Absence of Viral Pathogens and/or Toxins

Presence or absence of viral pathogens including HIV and Zika was assessed using enzyme-linked immunosorbent (ELISA) assays. Presence or absence of drugs and toxins was assessed by enzyme-linked ELISA methods. In some cases, liquid chromatography linked to mass spectrometry (LCMS) is used to confirm or better quantify the measurements. Substances assessed include but are not limited to benzodiazepines, cocaine metabolite benzoylecgonine, cotinine, ethyl alcohol, lysergic acid diethylamide (LSD), methamphetamine, opiates, phencyclidine (PCP), and tetrahydrocannabinol (THC).

Verification of sole source to a pre-screened and approved participant is done via nucleic acid methods. Such methods were also used for verification of human source versus bovine (or other animal) and verification of human source versus inclusion of plant "milk".

Freeze-Drying/Lyophilization:

In the lyophilization of larger amounts of frozen milk (e.g., 1 ton to several tons), it is preferable that the milk is not completely thawed in this process, rather the bulk frozen masses of milk are rendered into frozen flakes or shavings by a cryo-processor prior to filling of commercial freeze-driers. This obviates possible microbial contamination that can occur during an extended thawing process. Alternatively, the milk is cold-thawed sufficiently to allow pouring or pumping into the lyophilizer trays, then frozen solid and lyophilized.

Extraction of Fats:

The dry, lyophilized powder of human milk is extracted using food-approved solvents (Belitz et al., 2009; Schmid et al., 2016). This results in a separate phase of concentrated fats, fatty acids, lipids, and fat-soluble components such as some vitamins.

The preferred method is to use supercritical carbon dioxide as "solvent". The supercritical $CO_2$ is optionally supplemented with small amounts of a co-solvent, ethanol in particular, to optimize the interaction with partially polar molecules, like fatty acids (Machado et al., 2016; Idrus et al., 2018).

Supercritical $CO_2$ is a special phase of carbon dioxide that exists in a specific range of temperature and pressure (e.g., 31° C. and higher, 1075 psi and higher). In this form, the carbon dioxide has properties of both a gas and a liquid, and can function very effectively as a solvent (McHugh and Krukonis, 2013). At the end of the treatment, the $CO_2$ may be released to the atmosphere, or recycled to the process.

In either case, the original sample is rendered into two phases: 1) the remaining, dry, lyophilized fraction of mainly proteins and carbohydrates, and 2) the extracted fraction of milk fats or oils. The details of the phases and conditions of carbon dioxide are shown in FIG. 1.

Isolation of Proteins:

The dry, lyophilized proteins and carbohydrates are treated with a minimal amount of water adjusted in the range of 2.5 to 5, preferably pH 3 to 4.8 or pH 4 to 4.8. The water at this step serves as a processing aid in that many of the milk proteins are insoluble in water in the selected pH range, whereas the milk carbohydrates are soluble in this aqueous phase.

Milk caseins are readily precipitated by lowering the pH in the range of 3 to 4.8 (Northrop, 1923; O'Kennedy, 2011). This is accomplished by use of acids selected from mineral acids or food-grade materials like acetic acid or citric acid. These caseins are collected by filtration or centrifugation and dried, for example, at low temperatures in a forced-air oven or under partial vacuum. The remaining aqueous phase of milk carbohydrates, which at this stage also includes some of the whey proteins (albumin, globulins, and related molecules), is neutralized by addition of harmless amounts of food-grade bases like sodium hydroxide or ammonia.

Use of carbon dioxide again is the preferred method in the present invention for isolation of the milk proteins. Simply bubbling or pressurizing $CO_2$ into water lowers the pH into the desired range. Treating the lyophilized milk solids, after removal of the fats, with the mildly acidified water acts to solubilize the carbohydrates and some of the whey proteins, whereas the caseins are insoluble under these conditions (Jablonka et al., 1985, 1986; Jordan et al., 1987; Hofland et al., 1999, 2003). The insoluble protein fraction is collected by filtration or centrifugation. The remaining aqueous phase is outgassed by mild vacuum treatment to remove the $CO_2$, which also has the effect of restoring the pH to neutrality.

Milk albumins and globulins are also readily precipitated from the aqueous phase with some extra steps of manipulating the pH and temperature (Connolly, 1983, 1985). Another preferred method for quantitative precipitation of milk albumins involves adding an amount (up to 40%) of ethanol to the aqueous phase of milk carbohydrates and "whey" proteins, with or without mild pH shifts and mild heating (40 to 50° C.). These are then collected by filtration or centrifugation.

Isolation of both caseins and globulin/albumins can be accomplished simply by effecting a mildly acidic pH in water along with the ethanol addition/mild heating as above (Cohn et al., 1946, 19450; Ottenhof, 1985; Denizil, 2011; Raoufinia et al., 2016). In all cases, the yield of the proteins is preferred to be quantitative (in the range of 95% and higher).

Isolation of Carbohydrates:

Aqueous phase—Precipitation of carbohydrates requires more steps. An aqueous solution of carbohydrates is heated to 90 to 95° C. and higher, plus the pH is alkalinized by addition of sodium hydroxide (Linhardt and Bazin, 2001; Odaka et al., 2018). This denatures and hydrolyzes the carbohydrates partially, making them insoluble. Although the carbohydrates so produced retain food value, the heat treatment would be sacrificial to a sizable fraction of the desired molecules. In addition, the utility as a health-promoting component of milk for infants is compromised.

The preferred method for rendering the carbohydrate component as a dry solid is to re-lyophilize the remaining aqueous fraction of milk carbohydrates. This can remove the water, and the ethanol as well, if present. In so doing, essentially all of the beneficial components are preserved and the end result of the separation schemes are the dry, enriched products of milk proteins, milk fats, and milk carbohydrates.

Use of the Aqueous Phase of Milk Carbohydrates "as Is":

It is also an option to supplement the remaining aqueous phase of milk carbohydrates, provided it is otherwise solvent free, directly with the appropriate amounts of the dry powders of isolated milk proteins and milk lipids. The result is a liquid, fortified milk product.

Measurement of Macro-Components

Nutritive content of the milk is established by measurements of protein, lipids, carbohydrates, and caloric content by standard methods (Brandao et al., 2010; Choi et al., 2015; Adamkin and Radmacher, 2014; Fusch et al., 2015). Total solids and total dissolved solids of the original thawed samples and treated samples are measured by standard gravimetric techniques.

Other Additives

Vitamins, minerals, and probiotics are obtained as sterile product offerings from commercial suppliers. These supplements are added as needed or desired in amounts according to recommended protocols.

Adjustment of Osmolality

The aqueous carbohydrate fraction, along with the other additives if present, contains the components that largely contribute to osmolality—namely the inorganic salts and the low-molecular-weight carbohydrates. The salts are ionic whereas the carbohydrates are neutrally charged. Therefore, the dissolved salts can be removed, or their levels reduced if needed, by use of food-approved ion-exchange resins (Singh, I. et al., 2007; Mahore et al., 2010; FDA Code of Regulations 21.173 section 25, 2013). Such treatments are analogous to those commonly used in homes for ultra-purification of drinking water.

To gain a better understanding of the invention described herein, the following examples are set forth. It will be understood that these examples are intended to describe illustrative embodiments of the invention and are not intended to limit the scope of the invention in any way.

EXAMPLES

Example 1—Lyophilization and Drying of Human Milk

Frozen human milk, safety screened for drugs, microbes, and non-milk diluents, was cold thawed and/or macerated to produce a partially frozen slurry. This was poured while weighing into 8 pyrex dishes, each 12 by 16 by 3.5 cm, to a depth of approximately 1 cm. Each dish contained 300 g of milk. These were then frozen solid at $-20°$ C. in a commercial upright freezer, and then placed on three racks within the lyophilizer (HarvestRight scientific freeze dryer), precooled to $-20°$ C.

The vacuum pump was turned on, and internal pressure equilibrated, ranging about 100 to 200 (and lower) milliTorr (microns of mercury). The plate temperature on which the dishes rested was 40° C. The freeze-drying proceeded over the next 24 to 48 hours. At 17 hours, 3 sample dishes were removed from the lyophilizer, having equilibrated the pressure to atmospheric, quickly weighed to assess the progress of the drying, immediately returned to their places in the racks, and the freeze-drying recommenced. When the samples had reached a constant weight, the drying was considered to be complete. This was the case typically after roughly 24 hours. In some runs, the lyophilization was continued for another 24 hours, to confirm completion of the drying step.

For comparison, further drying of the milk was also checked by placement of the pyrex dishes post-lyophilization, and other samples of lyophilized human milk e.g. in small aluminum weighing boats, in a forced-air drying oven at temperatures ranging from 60° C. to 80° C. to 120° C. At 60° C. overnight, the dry weights so obtained matched closely with the dry weights as measured after lyophilization. The same was the case in the drying treatments at 80° C. In both of these cases, the color of the dried milk post treatment was like that of the lyophilized milk: white to cream-colored.

On the other hand, at 120° C., even after 2 to 3 hours, the milk began to darken to a tan color. Upon overnight drying at 120° C., the dry weight of the lyophilized powder was upwards of 10% less than that of an equivalent sample of lyophilized, 60° C. dried, or 80° C. dried human milk. Evidently, the lyophilized milk was not completely stable at 120° C. even though dry, presumably owing to degradation or loss of some components.

Consequently, dry weights of human milk as reported herein were recorded as lyophilized dry weights, which were equivalent to forced-air dry weights at ≤80° C.

Conversely, the lyophilized human milk was relatively stable in weight and color even if samples were left open to the atmosphere overnight at ambient temperatures (circa 20 to 25° C.). Samples at room temperatures also remained dry with stable weights if sealed in zip-lock bags for a month or more, but began to gain weight and became sticky after several months in zip-locks. After 8 months like this, a sample like this could increase in weight by up to 30%, presumably from uptake of humidity from the air. It could be redried at 60 or 80° C. to its original dry weight, with no apparent negative effects.

To avoid this problem, samples were not only sealed in zip-lock bags, but water-absorbing silica packets were added within the bags. The bags were then placed in sealed jars, themselves containing silica packets. So treated, the samples were stable in weight and color for 2 years or more.

In experiments as reported below, stable samples such as these having reliable dry weights were used.

Example 2—Assessment of Macronutrients of Human Milk Samples

Measurements of fats, proteins, carbohydrates, total solids, and freezing point depression were made by use of an in-house, analytical instrument specific for that purpose (FOSS MARS Milkoscan). The instrument was calibrated by the manufacturer from thousands of quantitative measures of these macronutrients made using bovine milk. Some human milk components are also available in sufficient amounts (10 g and more) and were used for this purpose. For example, two of the major human milk oligosaccharides were obtained from a commercial source (Glycom A/S).

Infrared spectra (FTIR) were scanned by use of the instrument, the peak heights and volumes of the relevant components having been calibrated and differentiated based on other wet-chemical and analytical methods. The instruments themselves have been evaluated and found to provide reliable assessments as compared to these standard methods as reported in the professional literature (Brandao et al., 2010; Fusch et al., 2015; Perrin et al., 2019).

Example 3—Extraction of Oily Fats and Fat Soluble Compounds Using Supercritical Carbon Dioxide Lyophilized, human milk samples were extracted with supercritical carbon dioxide using a lab instrument (OCO Labs, SuperC Extractor). The instrument has a stainless-steel reaction cylinder (dimensions) of 100 cubic centimeters in volume, with lyophilized human milk samples typically loaded in the range of 10 to 20 g as dry material. The instrument is recommended to operate at up to 90° C. with pressures in the range of 800 to 4,500 psi.

Carbon dioxide was supplied from pressurized gas cylinders. Temperature was maintained via thermostat, and pressure maintained via a modulating needle valve that is actuated via a stepper motor to continuously release small amounts of $CO_2$ to the atmosphere as an experiment proceeds. Thus, there was a controlled flow-through of supercritical $CO_2$ with delivery of the extracted oils to a collection vessel continuously upon sudden depressurization to atmospheric with each modulation of the needle valve.

The instrument performed most effectively and reliably during extractions of lyophilized human milk at 3,000 to 3,500 psi over time intervals of 30 to 120 minutes at temperatures of 60 to 70° C. and below, with a sample loading of 15 grams.

In some cases, a cellulosic filter formed from 100% cellulosic paper (dried and weighed) and fitted at the inflow and outflow of the reaction cylinder as a guard against loss of powder during flow-through of the supercritical carbon dioxide, or otherwise loss of product upon filling at the beginning and opening and clearing the reaction vessel at the end of an experiment.

Example 4—Extraction of 12.5 g Lyophilized Human Milk at 50° C.; 2,800 psi; 75 Minutes Reaction Time Yield of milk oil (fats and fat soluble materials)=3.3 g.
Yield of protein plus carbohydrates fraction=8.9 g.
Theoretical yield of milk oil based on average value of 4 parts fats, 1 part protein, 7 parts carbohydrates in human milk, or 33% of initial weight of 12.5 g as fats=4.17 g.
Actual yield of milk oils: (3.3 g/4.17 g)100=79% of theoretical.
Note: Actual total yield of 3.3 g milk oils+8.9 g protein & carbohydrate (prot-carb) fraction=12.2 grams.
This is (12.2 g recovered/12.5 g initial weight)100=98% total yield.

Example 5—Extraction of 20.5 g Lyophilized Human Milk at 55° C.; 2,500 psi; 70 Minutes Reaction Time Yield of milk oils (fats and fat soluble materials)=5.7 g.
Yield of protein plus carbohydrates (prot-carb) fraction=14.0 g.
Theoretical yield of milk oils at 33% of 20.5 g=6.77 g. Actual yield (5.7 g/6.77 g)100=84% of theoretical.
Total actual yield of both fractions (milk oils and prot-carb)=19.7. This is (19.7 g/20.5 g)100=96% of theoretical.

Example 6—Extraction of 15.5 g Lyophilized Human Milk at 50° C.; 2,000 psi; 100 Minutes Reaction Time Yield of milk oils (fats and fat soluble materials)=2.3 g.
Yield of prot-carb protein fraction=12.8 g.
Theoretical yield of milk oils at 33% of 15.5 g=5.12 g. Actual yield (2.3 g/5.12 g)100=45% of theoretical.
Total actual yield of both fractions (milk oils and prot-carb)=15.1. This is (15.1 g/15.5 g)100=97% of theoretical.

Example 7—Extraction of 10 g Lyophilized Human Milk at 50° C.; 4,000 psi; 100 Minutes Reaction Time Yield of milk oils (fats and fat soluble materials)=3.3 g.
Yield of prot-carb fraction=6.5 g.
Theoretical yield of milk oils at 33% of 10 g=3.3 g. Actual yield (3.3 g/3.3 g)100=100% of theoretical.
Total actual yield of both fractions (milk oils and prot-carb)=9.8 g. This is (9.8 g/10 g)100=98% of theoretical.

Example 8—Extraction of 10 g Lyophilized Human Milk Plus 10 g of Glass Beads (3 mm Diameter) at 50° C.; 4,000 psi; 90 Minutes Reaction Time Yield of milk oils (fats and fat soluble materials)=2.6 g.
Yield of prot-carb fraction=7.2 g
Theoretical yield of milk oils at 33% of 10 g=3.3 g. Actual yield (2.6 g/3.3 g)100=79% of theoretical.
Total actual yield of both fractions (milk oils and prot-carb)=9.8 g. This is (9.8 g/10 g)100=98% of theoretical.

Example 9—Extraction of 16 g Lyophilized Human Milk at 40° C.; 3,200 psi; 90 Minutes Reaction Time Yield of milk oils (fats and fat soluble materials)=2.1 g.
Yield of prot-carb fraction=13.4 g.
Theoretical yield of milk oils at 33% of 16 g=5.28 g. Actual yield (2.1 g/5.28 g)100=40% of theoretical.
Total actual yield of both fractions (milk oils and prot-carb)=15.5 g. This is (15.5 g/16 g)100=97% of theoretical.

Example 10—Extraction of 15 g Lyophilized Human Milk at 60° C.; 3,200 psi; 120 Minutes Reaction Time Yield of milk oils (fats and fat soluble materials)=3.8 g.
Yield of prot-carb fraction=11.2 g.
Theoretical yield of milk oils at 33% of 15 g=4.95 g. Actual yield (3.8 g/4.95 g)100=77% of theoretical.
Total actual yield of both fractions (milk oils and prot-carb)=15 g. This is (15 g/15 g)100=100% of theoretical.

Example 11—Comparison of Precipitation of Milk Proteins at pH 4 from Lyophilized Human Milk and from the Prot-Carb Fraction in Water and in a 50/50 Weight % of Water and Ethanol Precipitation of milk proteins from lyophilized human milk was observed by addition of 5 g lyophilized human milk into 50 g of aqueous solution having pH 4 into a 4-oz glass vessel. For comparison, 5 g of lyophilized human milk was also added to a 4-oz glass vessel containing 25 g of distilled water and 25 g of ethanol (100%). For further comparison, parallel experiments were conducted using 2.5 g of the prot-carb fraction of example 7: treatment in 25 g distilled water and treatment in 12.4 g water plus 12.5 g ethanol as 50/50 wt % water/ethanol in similar 4 oz vessels. The vessels were set on the lab bench unstirred and the precipitates allowed to settle.

Figure 2:
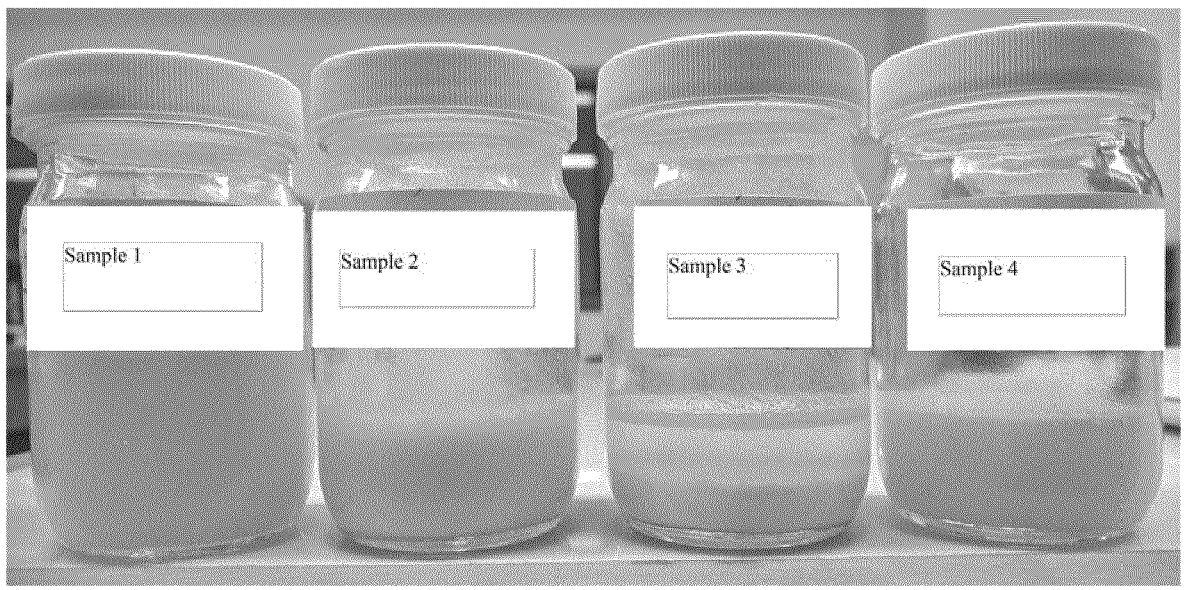
FIG. 2 illustrates results of treatments of 10% by weight lyophilized whole human milk and 10% by weight of the protein/carbohydrate fraction of human milk at pH 4 in distilled water and in distilled water and ethanol at 50/50% by weight.

A clearly defined precipitated layer formed in the prot-carb fraction almost immediately. A clear precipitated layer also formed in the lyophilized, whole human milk treatment, but the precipitate formed more slowly over approximately 30 minutes, and was less compact. The results are seen in FIG. 2, with images taken after settling on the lab bench overnight.

The pH was adjusted to pH 4 by addition of 1 N HCl and measured using a combination pH electrode and meter. Milk components were seen to influence the pH readings of pH standard solutions of significantly higher molarities, shifting the readings upward to some extent. Therefore efforts were undertaken to standardize the electrode and the meter via standard addition of lyophilized milk and prot-carb fractions to the pH standard buffers.

Example 12—Comparison of Precipitation of Milk Proteins at pH 4 from Lyophilized Human Milk and from the Prot-Carb Fraction in Water without Ethanol Addition Precipitates also formed in lyophilized, whole human milk and in the protein/carbohydrate fraction when treated in distilled water with pH adjustment without ethanol addition, but only slowly, to an observable lesser extent, and without clear definition as a discrete, settled layer. The pH of lyophilized, whole human milk samples in distilled water ranged about pH 5.8 whereas the pH of the protein/carbohydrate fraction of samples in distilled water ranged about pH 6.5. Numerous prior studies have shown that the pH treatment alone can result in precipitation of casein proteins but not whey proteins or carbohydrates.

Example 13—Precipitation of Milk Proteins from Lyophilized Human Milk and from the Prot-Carb Fraction in 50/50 Weight % Water and Ethanol without pH Adjustment Proteinaceous precipitates were obtained from lyophilized whole human milk, as well as the protein/carbohydrate fraction, when each were treated in the 50/50 weight % solution of distilled water and ethanol. The protein-carbohydrate fraction was extracted from the lyophilized whole, human milk using supercritical $CO_2$ at 3,000 psi, 60° C., for 90 minutes.

Figure 3:
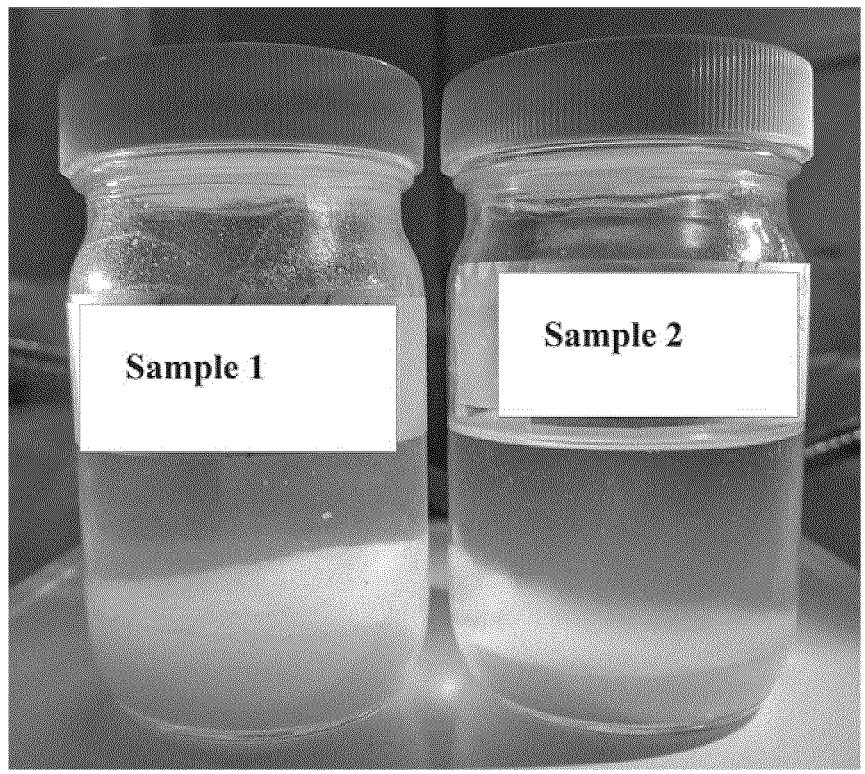
FIG. 3 illustrates results of treatment of lyophilized human milk and a protein-carbohydrate fraction in a 50/50 weight % solution of distilled water and ethanol.

Samples were prepared as 10% by weight solutions in water to which ethanol was added. As shown in FIG. 3, a significant precipitate settled from the treated solutions. The precipitate began to form more quickly and consolidated better in the prot-carb treatment. Settling was evident within minutes and well-formed layers separated over the next 30 minutes in both treatments.

The precipitates were separated from the supernatants by centrifuging at 13,200 rpm, 16.1 relative centrifugal force for 5 minutes. Well-formed pellets resulted. These were washed with 100% ethanol, then resuspended in distilled water.

The pelleted materials were white and soft although well integrated. They could be picked up with a spatula and manipulated without falling apart. When resuspended in water, they were resistant to solubilization at first, but upon addition of 1 N NaOH to initial pH 10 with warming to 60 C and smooth but vigorous magnetic stirring, it dissolved to a milk-like appearance.

The sample prepared from lyophilized whole, human milk still contained residual fats, which did not dissolve, but remained as suspended materials. The pH of the redissolved samples ranged from pH 8.3 to 8.5.

The FTIR analysis of the pelleted material from the protein-carbohydrate fraction indicated a composition of 67 g protein, 20 g carbohydrates (protein/carbohydrate ration=3.35), and 13 g fats per 100 g of material.

The FTIR analysis of the pelleted material from the treatment of lyophilized, whole human milk indicated 63 g protein, 10 g carbohydrates, and 27 g fats per 100 g of material.

Example 14. Precipitation in Water of Milk Proteins from the Protein-Carbohydrate Fraction by Treatment with Carbon Dioxide Gas, Liquid Carbon Dioxide, or Supercritical $CO_2$ A 10% by weight solution of the protein-carbohydrate fraction of lyophilized human milk was treated with carbon dioxide gas at 30° C., 800 psi for 1 hour (see FIG. 1). The $CO_2$ was provided in the reaction cylinder of the $CO_2$ instrument above the solution as an atmosphere and/or provided from below to pass through the liquid phase. In both cases, the pH as measured in the outflow at the end of the treatment ranged around pH 5.2, but did not reach levels in the lower range of pH 3 to 4.8. Consequently, the precipitation was incomplete. When the $CO_2$ was provided via microbubbling on a recycled basis, the pH does reach these preferred levels, and the precipitation becomes complete.

The prot-carb solution was also treated with liquid $CO_2$ at 30° C., 2,200 psi for 1 hour. Similarly, the prot-carb solution was treated with supercritical $CO_2$, now again in a non-liquid, gas phase, for an hour at 50° C., 3,000 psi. In both cases, the pH as measured at the outflow ranged around pH 5.2. It was thus possible to obtain a partial precipitate of milk proteins by these treatments, but the preferred delivery method for the $CO_2$ is by microbubbling or otherwise from below on a recycled basis.

Example 15—Precipitation in Water of Milk Proteins from the Protein-Carbohydrate Fraction by Acid-Treatment in Carbonated Water Another way to precipitate milk proteins from the protein-carbohydrate fraction is to dissolve the protein-carbohydrate fraction of lyophilized human milk in carbonated water, i.e. water already treated with $CO_2$ under pressure to a pH of 3 and lower. With this treatment, the precipitation of the milk proteins was observed to be more complete.

Example 16—Precipitation in Water of Milk Proteins from the Protein-Carbohydrate Fraction by Acid-Treatment to Lower pH and Enhance Precipitation of Milk Proteins Mild addition of 1 N HCl or 1 N $H_2SO_4$ was used to adjust the pH of the protein-carbohydrate fraction into the range of pH 3 to 4.8. As previously discussed, milk proteins, in particular the caseins, are insolubilized by these treatments and form a precipitate. These proteins were observed to form out of solutions, but as a gel-like suspension. As such, they were not separable by filtration and required centrifugation for removal from the liquid phase.

An advantage of using HCl for such treatment is that the HCl can be removed under vacuum, restoring the solution or the lyophilisate to the original pH if the solution is so treated. The other mineral acids like $H_2SO_4$ become concentrated in the solid phase upon vacuum treatment or drying, rendering the product into an acidic form.

Example 17—Isolation of Milk Proteins from the Supernatant after Precipitation Not being filterable, the precipitate was instead separated from the supernatant by centrifugation (Eppendorf model 5415D). Treatment at 3,500 rpm (rotor radius=15 cm) for 5 minutes was sufficient to bring down the proteins as a pellet. The pellet was firmer after 10, then 15 minutes, or by increasing the rpm upwards stepwise to 13,200 (rcf=16.1 g forces). In any case, formation of a pellet was straightforward.

The nominal volumes of supernatant were removed by hand-pipette and the pellets washed with equivalent volumes of ethanol three times. The pellets were combined, resuspended in a total volume of 20 ml distilled water, and redissolved by vortexing. This resuspended and redissolved solution was next subjected to protein analysis as well as the other macronutrient components and milk parameters.

As shown in FIG. 4, it was possible to extract samples of a wide variety of fractional amounts of protein, carbohydrates, and oils from lyophilized human milk via supercritical $CO_2$ treatments. In turn, these samples could be used "as is" or combined in the appropriate relative amounts to yield desired fractional amounts of the macronutrients. Fortified human milk products can be made this way.

Example 18. Fortified Human Milk Formulations

Recommendations for fortified human milk emphasize increasing the amount of protein per ounce while keeping the overall energy levels around 100 calories per feeding (typically 4 oz.; e.g., Adamkin and Radmacher, 2014). By way of exemplification, 3.4 g of sample #6 above would contain 3 g protein and 0.4 g of carbohydrate. If this is added to 10 g of the lyophilized whole human milk of sample #8, the formulation would now contain 4 g of protein, 7.2 g of carbohydrate, and 2.2 g of fats. Adding this (13.4 g) to 4 ounces (118 ml) of water would yield a fortified human milk at 11% by weight total solids, not inclusive of inorganic salts and other minor components.

Given 4 calories per gram protein, 4 calories per gram carbohydrates, and 9 calories per gram fats (on average in human milk), the total caloric value for 13.4 g of this formulation would be 64.6 calories. The formula could be supplemented as needed, if desired, to increase the caloric value.

That is, if an exact caloric value of 100 calories per 100 ml feeding is desired, it is an easy matter to add more of one component or another, or in combination, to fix the caloric level at 100 calories. For example, the milk oils are isolated at purity in the supercritical $CO_2$ step whereas the carbohydrates are highly concentrated into the supernatant during the protein precipitation step.

By way of another example of a fortifier composition, 4.42 g of the pelleted material of Example 13 would contain 3 g of protein, 0.9 g of carbohydrates, and 0.52 g of fats. This would comprise a total of 20.28 calories at 4 calories/g protein, 4 calories/g carbohydrates, and 9 calories/g fats.

This could be added and stirred into 100 ml of whole, liquid, human milk as a powder. If the human milk sample contained the average amounts of 1 g protein, 7 g carbohydrates, and 4 g fats per 100 ml, translating to 68 calories, the fortified milk would then contain 88.3 calories per 100 ml.

The overall composition of the milk in this example per 100 ml would be 4 g protein (16 cal), 7.9 g carbohydrates (31.6 cal), and 4.52 g fats (40.68 cal).

Alternatively, the fortifier composition could be prepared as a concentrated liquid in, for example 10 or 20 ml of water, and pipetted or otherwise added to the whole, liquid, human milk to fortify it. In this case, the overall caloric value per 100 ml would be adjusted to account for the added volume.

It is evident that a formulation of fortified human milk of virtually any fractional composition of the macronutrients can be made by appropriately mixing samples of the present invention such as prepared and exemplified above.

Moreover, it is further possible by adjusting the temperature, pressure, and duration of the supercritical $CO_2$ step, to achieve partial removal of the milk oils, with concomitant proportional increases in proteins and carbohydrates in the extracted material. This is shown in Examples 4 through 10 in which the yield of milk oils ranged from roughly 20% to 100% of theoretical, depending on the reaction conditions.

Example 19—Combined Supercritical $CO_2$ and Conventional Methods for Separation of Milk Fractions It is also desirable to be able to further separate and optimize the macronutrient levels of the prot-carb fractions, without the pH precipitation, with or without the solvent (e.g., ethanol) treatment, or without the combination pH/solvent treatment.

A recommended approach to this is to bring a prot-carb fraction into solution "as is", then subject it to conventional separation techniques. Skimming or centrifugation of residual milk fats may not be needed, as the supercritical $CO_2$ treatment can remove this fraction entirely. Conventional ultrafiltration, and reverse osmosis, if desired, of the redissolved protein-carbohydrate fraction would separate the proteins from the carbohydrates. The carbohydrate fraction could be further treated by ultrafiltration to separate lactose from the oligosaccharides, if desired.

The resulting fractions, now in an aqueous state, or partly aqueous state if some of the emulsion phase (the milk fats) as well as some suspended solids are carried over, can be dried if desired, preferably by lyophilization.

Supercritical $CO_2$ treatment is preferred for removal of fats when the feedstock is lyophilized powder, because the extraction routinely can be ≥99% efficient. By comparison, separation of milk fats from whole, liquid, human milk by conventional skimming and/or centrifugation steps results in a cream that typically is approximately 25% fats and the rest as an aqueous fraction which still contains the other macronutrients and water-soluble materials.

The solids of the resulting aqueous phase exclusive of the cream are primarily comprised of the proteins and carbohydrates. This liquid can be lyophilized or otherwise dried to produce a dry protein-carbohydrate fraction. This dry fraction could then be further processed by retaking it into an aqueous state for conventional ultrafiltration and reverse osmosis, if desired. This seems counterintuitive, as the protein-carbohydrate fraction was already in an aqueous state via conventional methods. In addition, this conventional protein-carbohydrate fraction does not contain those macronutrients that were removed as "cream".

However, the protein-carbohydrate fractions containing essentially all of the milk proteins and carbohydrates are directly available via supercritical $CO_2$ extraction of lyophilized, whole human milk. Use of this kind of fraction or fractions as feedstock, including a dissolution step, for conventional processing to further separate and concentrate the components in aqueous solutions thus provides novel advantages. That is, this combination of supercritical $CO_2$ and conventional processing would then result in a fuller complement of the milk proteins and carbohydrates than the conventional processing alone.

Example 20. Supercritical $CO_2$ as Co-Solvent

After the extraction of the milk fats, as in examples 11 through 17, other solvents can be added to the prot-carb fraction. As exemplified, additional water, ethanol, carbonated water, and dilute acids or bases are useful in this regard. Lyophilized, whole human milk can also be treated from the outset with supercritical $CO_2$ as a co-solvent. The supercritical $CO_2$ and other solvent can be deployed statically within the reactor, or preferably set to recycle through the solid phase of the prot-carb fraction or the lyophilized whole human milk.

Particularly in the case of lowering the pH of milk by infusion of $CO_2$, it is preferred to recycle the solvent or co-solvents. The pH of milk can be lowered into the target range of pH 4 to 4.8, and lower, by static infusion of $CO_2$. However, this is a slow process and not preferred as it slows the precipitation and may make it incomplete.

The preferred method is to deliver the $CO_2$ from below, or otherwise directly into the solution, using a microbubbling device, so that the $CO_2$ flows and is recycled to the process. So arranged, the pH shift is rapid, reaching levels in the range of pH 3 (Balaban et al., 1991; Hofland et al., 1999; Yoshimura et al., 2002), including lowering the pH of milk (Erkman, 1997).

Example 21. Osmolality

The osmolality of the lyophilized human milk samples and its fractions when redissolved was assessed based on values of freezing point depression (FPD). These were measured via the analytical instrument (FOSS FTIR MARS Milkoscan) along with the other parameters, and converted to osmolality according to the physical chemical constant assigned to a FPD attributable 1 mole of solute per kilogram of water of minus (−) 1.86° C. Thus, a solution having a freezing point depression of −0.186° C. has an osmolality of 0.1, or 0.1 mOsm. This corresponds to 100 millimoles of solute per kg of solution.

The osmolalities of the lyophilized human milk ranged from approximately 150 to 300 mOsm, whereas, the osmolalities of the prot-carb fractions at 10% solids on average were approximately 300 mOsm, each well within the target values of 400 to 600 mOsm.

It is evident that macronutrient fractions of human milk can be used to supplement lyophilized whole human milk to make a fortified human milk formulation that falls within the target values for osmolality. For example, even relatively high mOsm human milk can be supplemented with 2 or 3 grams of human milk protein per 4 ounce feeding, raising the mOsm minimally because the high-molecular weight proteins do not add significantly to osmolality.

Similarly, the milk fats do not add significantly to osmolality. Hence, these can also be used to supplement lyophilized whole human milk if desired and keep within the mOsm guidelines, while also contributing to the energy values if desired at 9 calories per gram of milk fats on average.

The milk carbohydrates are the main contributors to mOsm values of human milk. However, these too can be used to supplement lyophilized whole human milk, which typically has significant margin for increasing mOsm while remaining within the recommended limits of mOsm of human milk.

In this regard, there may be reasons to supplement the amounts of human milk carbohydrates, in particular of human milk oligosaccharides, provided to infants. Promotion of digestive health is the best documented such reason at present. Hence, it may be desirable to provide elevated levels of these milk carbohydrates while controlling the osmolality to which the infant digestive tract is subjected. In this case, separate dosing of human milk carbohydrates can be provided to the infants, excluding or limiting the other macronutrients, as a specific beneficial therapy or preventative.

Example 22—Sterilization

Products may be sterilized, if desired, by standard Holder pasteurization, by high-temperature, short-time treatment (HTST), retorting, or other methods including gamma radiation and vapor phase infusion (Rutala and Weber, 2017).

Example 23—Packaging

Fortifier products of the present invention are provided as liquids, for example, in 5 to 20 ml vials or syringes for addition to milk as 1 vial or syringe per ounce of human milk, or in other suitable containers and volumes. The fortified milk is also provided in ready-to-feed, 4 ounce bottles and other packaging. Powdered forms of the products are provided in jars, bottles, packets, boxes, or other standard packaging.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims

REFERENCES

Abrams, S. A., S. Landers, L. M. Noble, and B. B. Poindexter. 2017. Donor human milk for the high-risk infant: preparation, safety, and usage options in the United States. American Academy of Pediatrics, Policy Statement. Pediatrics 139, p. 1-6.

Adamkin, D. H. and P. G. Radmacher. 2014. Fortification of human milk in very low birth weight infants (VLBW, 1500 g birth weight). Clinical Perinatology 41, 405-21.

Aydin, M. S, Yigit, E. N., Vatanda lar, E., Erdogan, E., and G. Ozturk. 2018. Transfer and Integration of Breast Milk Stem Cells to the Brain of Suckling Pups. Scientific Reports 8, 9 pgs.

Balaban, M. O., A. G. Arreola, M. Marshall, A. Peplow, C. I. Wei, and J. Cornell. 1991. Inactivation of pectinesterase in orange juice by supercritical carbon dioxide. Journal of Food Science 56, 743-746.

Ballard, O. and A. L. Morrow. 2013. Human milk composition: nutrients and bioactive factors. Pediatric Clinics of North America 60, 49-74.

Barrett-Reis, B., P. A. Reynolds, M. B. Montallo, and D. L. O'Connor. 2002. Powdered human milk fortifier. U.S. Pat. No. 6,472,003.

Belitz, H-D., W. Grosch, and P. Schieberle. 2009. Edible fats and oils. Food Chemistry. Springer, Berlin, p. 640-669.

Berg, B., Z. Jouni, A. Wittke, R. Waworuntu, and M. Chichlowski. 2017. Nutritional compositions containing synergistic combination and uses thereof. U.S. Pat. No. 9,609,888. 29 pgs.

Bertino, E., M. Giribaldi, E. A. Cester, A. Coscia, B. M. Trapani, C. Peila, S. Arslanoglu, G. E. Moro, and L. Cavallarin. 2017. New human milk fortifiers for the preterm infant. Journal of Pediatric and Neonatal Individualized Medicine 6, p. 1-7

Brandao, M. C., A. P. Carmo, M. J. Bell, and V. C. Anjos. 2010. Characterization of milk by infrared spectroscopy. Revista do Instituto de Laticinios 65, 30-33.

Buck, R., G. O. Duska-McEwen, and J. Schaller. 2017. Nutritional formulations including human milk oligosaccharides and antioxidants and uses thereof. U.S. Pat. No. 9,808,474. 40 pgs.

Chichlowski, M. and B. Berg. 2018. Nutritional composition with human milk oligosaccharides and uses thereof. U.S. patent application Ser. No. 15/256,795. 28 pgs.

Chichlowski, M. and B. Berg. 2018. Personalized pediatric nutrition products comprising human milk oligosaccharides. U.S. patent application Ser. No. 15/293,437. 21 pgs.

Choi, A., G. Fusch, N. Rochow, N. Sheikh, and C. Fusch. 2015. Establishment of micromethods for macronutrient contents analysis in breast milk. Maternal and Child Nutrition 11, 761-72.

Choi, A., G. Fusch, N. Rochow, and C. Fusch. 2016. Target fortification of breast milk: predicting the final osmolality of the feeds. PLOS One, p. 1-12.

Cohn, E. J., L. E. Strong, W. L. Hughes, D. J. Milford, J. N. Ashworth, M. Melin, and H. L. Taylor. 1946. Preparation and properties of serum and plasma proteins: a system for the preparation into fractions of protein and lipoprotein components of biological tissues and fluids. Journal of the American Chemical Society 68, 459-475.

Cohn, E. J., F. R. N. Gurd, D. N. Surgenor, B. A. Barnes, R. K. Brown, G. Derouaux, J. M. Gillespie, F. W. Kahnt, W. F. Lever, C. H. Liu, D. Mittelman, R. F. Mouton, K. Schmid, and E. Uroma. 1950. A system for the separation of the components of human blood: quantitative procedures for the separation of the protein components of human plasma. Journal of the American Chemical Society 72, 465-474.

Connolly, P. B. 1983. Method of producing milk protein isolates and milk protein/vegetable protein isolates and compositions of same. U.S. Pat. No. 4,376,072.

Connolly, P. B. 1985. Method of precipitating whey protein in treating an aqueous system containing whey proteins. European patent 0 064 509.

Davies, D. P. 1997. Adequacy of expressed breast milk for early growth of preterm infants. Archives of Disease in Childhood 52, 296-301.

De Curtis, M., M. Canduso, C. Pieltain, and J. Rigo. 1999. Effect of fortification on the osmolality of human milk. Archives of Disease in Childhood. Fetal and Neonatal Edition 81, 141-43.

Denizil, A. 2011. Plasma fractionation: conventional and chromatographic methods for albumin purification. Hacettepe Journal of Biology and Chemistry 39, 315-341.

Erkman, O. 1997. Antimicrobial effect of pressurized $CO_2$ on *Staphylococcus aureus* in broth and milk. Journal of Food Science and Technology 71, 826-829.

Euber, J. R., H. A. Solorio, R. P. Batema, and K. R. Walsh. 2012. Acidified liquid human milk supplement. U.S. Pat. No. 8,147,894.

Food and Drug Administration. 2013. Ion exchange resins. Code of Federal Registration CFR 21, 173.25, 124-128.

Food and Drug Administration. 2018. Infant formula: the addition of minimum and maximum levers of Selenium to infant formula and related labeling requirements. Code of Federal Registration CFR 80, 35834-35841.

Fournell, J., S. Eaker, S. Elster, and D. J. Rechtman. 2015. Human milk permeate compositions and methods of making and using same. U.S. Pat. No. 8,927,027.

Fournell, J., S. Eaker, S. Elster, and D. J. Rechtman. 2018. Human milk permeate compositions and methods of making and using same. U.S. patent application Ser. No. 15/726,232.

Fusch, G., N. Rochow, A. Choi, S. Fusch, S. Poeschl, A. O. Ubah, S-Y Lee, P. Raja, and C. Fusch. 2015. Rapid measurement of macronutrients in breast milk: How reliable are infrared milk analyzers. Clinical Nutrition 34, 465-76.

German, J. B., D. Mills, C. B. Lebrilla, D. Barile, and R. LoCascio. 2017. Bovine milk oligosaccharides. U.S. Pat. No. 9,808,475. 19 pgs.

Hassiotou, F., A. Beltran, E. Chetwynd, A. M. Stuebe, A-J Twigger, P. Metzger, N. Trengove, C. T. Lai, L. Filgueira, P. Blancafort, and P. E. Hartmann. 2012. Breastmilk Is a Novel Source of Stem Cells with Multilineage Differentiation Potential. Stem Cells 2012, 2164-2174.

Hofland, G. W., M van Es, L. A. M van der Wielen, and G-J Witkamp. 1999. Isoelectric precipitation of casein using high-pressure CO2. Industrial and Engineering Chemistry Research 38, 4919-27.

Hofland, G. W., M. Berkhoff, G. J. Witkamp, and L. A. M. van der Wielen. 2003. Dynamics of precipitation of casein with carbon dioxide. International Dairy Journal 13, 685-97.

Hondmann, D., E. A. F. van Tol, G. Gross, M. H. Schoemaker, and T. T. Lambers. 2016. Nutritional composition containing a peptide component with anti-inflammatory properties and uses thereof. U.S. Pat. No. 9,457,058. 23 pgs.

Hossain, Z., W. Diehl-Jones, D. S. Mackay, A. Chui, and J. K. Friel. 2014. Human milk and the premature infant. In, Handbook of dietary and nutritional aspects of bottle feeding, chapter 18, Wageningen Academic, Eds. V. R. Preedy, R. R. Watson, and S. Zibadi. 34 p.

Idrus, N. F. M., L. N. Yian, Z. Idham, N. A. Aris, N. R. Putra, A. H. A. Aziz, and M. A. C. Yunus. 2018. Mini review: application of supercritical carbon dioxide in extraction of propolis extract. Malaysian Journal of Fundamental and Applied Sciences 14, 387-396.

Jablonka, M. S. and P. A. Munro. 1985. Particle size distribution and calcium content of batch-precipitated acid casein curd: effect of precipitation temperature and pH. Journal of Dairy Research 52, 419-28.

Jablonka, M. S. and P. A. Munro. 1986. Effect of temperature and pH on the continuous pilot-scale precipitation of acid casein curd. New Zealand Journal of Dairy Science and Technology 21, 111-23.

Janjindamai, W. and T. Chotsampancharoen. 2006. Effect of fortification on the osmolality of human milk. Journal of the Medical Association of Thailand 89, 1400-03.

Jordan, P. J., K. Lay, N. Ngan, and G. F. Rodley. 1987. Casein precipitation using high pressure carbon dioxide. New Zealand Journal of Dairy Science and Technology 22, 247-56.

Koo, W. and H. Tice. 2018. Human milk fortifiers do not meet the current recommendation for nutrients in very low birth weight infants. Journal of Parenteral and Enteral Nutrition 42, 813-820.

Kyle, D., D. Mills, and S. Freeman-Sharky. 2017. Activated Bifidobacteria and methods of use thereof. U.S. patent application Ser. No. 15/521,502. 14 pgs.

Li, C., N. W. Solomons, M. E. Scott, and K. G. Koski. 2016. Minerals and trace elements in human breast milk are associated with Guatamalan infant anthropometric outcomes within the first 6 months. Journal of Nutrition 146, 2067-74.

Linhardt, R. and H. G. Bazin. 2001. Separation and purification of carbohydrates. In: Fraser-Reid B. O., Tatsuta K., Thiem J. (eds.) Glycoscience: Chemistry and Chemical Biology I-III. Springer, Berlin, Heidelberg. Chapter 1.3, p. 63-74.

Machado, B. A. S., R. P. D. Silva, G. de Abreu Barreto, S. S. Costa, D. F. da Silva, H. N. Brandao, J. L. C. da Rocha, O. A. Dellagostin, J. A. P. Henriques, M. A. Umsza-Guez, and F. F. Padilha. 2016. Chemical composition and biological activity of extracts obtained by supercritical extraction and ethanolic extraction of brown, green and red propolis derived from different geographic regions in Brazil. PLOS One, p. 1-26.

Mahore, J. G., K. J. Wadher, M. J. Umekar, and P. K. Bhoyar. 2010. Ion exchange resins: pharmaceutical applications and recent advancement. International Journal of Pharmaceutical Sciences Review and Research 1, 8-13.

Martin, J. A., Hamilton, B. E., Osterman, M. J. K., and A. K. Driscoll. 2019. Births: Final Data for 2018, National Vital Statistics Reports, 67 pgs.

McHugh, M. and V. Krukonis. 2013. Supercritical fluid extraction: Principles and practice. $2^{nd}$ edition. Butterworth-Heinemann. 608 p.

Medo, E. M., M. L. Lee, D. J. Rechtman, and J. Fournell. 2013. Human milk compositions and methods of making and using same. U.S. Pat. No. 8,545,920.

Mills, D. A., C. B. Lebrilla, R. LoCascio, M. Ninonuevo, J. B. German, and S. Freeman. 2012. Human milk oligosaccharides to promote growth of beneficial gut bacteria. U.S. Pat. No. 8,197,872. 40 pgs.

Northrop, J. H. 1923. Note on the purification and precipitation of casein. Journal of General Physiology 5, 749-50.

Odaka, M., T. Murakami, Y. Sakai, K. Miyauchi, and H. Koishihara. 2018. Method for manufacturing modified whey composition. U.S. Pat. No. 9,894,911.

O'Kennedy, B. T. 2011. Caseins. Chapter 2. In, Handbook of Food Proteins, Woodhead Series in Food Science, Technology and Nutrition, 13-29.

Ottenhof, H. A. 1985. Process for the preparation of a precipitate of casein and whey protein. U.S. Pat. No. 4,519,945.

Pearson, F., M. J. Johnson, A. A. Leaf. 2013. Milk osmolality: does it matter? Archives of disease in childhood—Fetal and neonatal edition, 98, 166-69.

Perrin, M. T., J. Festival, J., S. Starks, L. Mondeaux, E. A. Brownell, and A. Vickers. 2019. Accuracy and reliability of infrared analyzers for measuring human milk macronutrients in a milk bank setting. Current Developments in Nutrition 3, 7 pgs.

Prentice, A. 1996. Constituents of human milk. Food and Nutrition Bulletin 17, 305-12.

Raoufinia, R., A. Mota, N. Keyhanvar, F. Safari, S. Shamekhi, and J. Abdolalizadeh. 2016. Overview of albumin and its purification methods. Advanced Pharmaceutical Bulletin 6, 495-507.

Rigourd, V., I. D. Brahimi, S. Smii, C. Gobeaux, H. Razafimahefa, T. Hachem, M. Granier, and R. Serreau. 2016. High osmolality of fortifier human milk adding with vitamin (ADEC). Journal of Pharmacology and Clinical Research 1, 1-4.

Rosales, F. J., E. van Tol, G. P. Rai, K. Morris, D. Banavera, D. Hondman, Z. E. Jouni, R. J. McMahon, D. A. Schade, and D. C. Walker. 2012. Nutritional composition to promote healthy development and growth. U.S. Pat. No. 8,287,931.

Rosales, F. J., E. van Tol, G. P. Rai, K. Morris, D. Banavera, D. Hondman, Z. E. Jouni, R. J. McMahon, D. A. Schade, and D. C. Walker. 2016. Nutritional composition to promote healthy development and growth. U.S. Pat. No. 9,439,448.

Rutala, W. A. and D. J. Weber. 2017 update. Centers for Disease Control and Prevention. Guideline for Disinfection and Sterilization in Healthcare Facilities. 161 pgs.

Sangild, P. T. 2016. Compositions for use in the prevention or treatment of necrotizing enterocolitis in infants and young children. U.S. patent application Ser. No. 15/036, 854. 13 pgs.

Sangild, P. T. 2016. Compositions for use in the prevention or treatment of necrotizing enterocolitis in infants or young children born by C-section. U.S. patent application Ser. No. 15/036,855. 13 pgs.

Sauret, A., M. C. Andro-Garcon, J. Chauvel, A. Ligneul, P. Dupas, C. Fressange-Mazda, P. Le Ruyet, and A. Dabadie. Osmolality of a fortified human preterm milk: the effect of fortifier dosage, gestational age, lactation stage, and hospital practices. Archives de Pediatrie 25, 411-15.

Schanler, R. J. 1995. Suitability of human milk for the low-birthweight infant. Clinical Perinatology 22, 207-22.

Schmid, M., F. Guiheneuf, D. B. Stengel. 2016. Evaluation of food grade solvents for lipid extraction and impact of storage temperature on fatty acid composition of edible seaweeds Laminaria digitate (Phaeophyceae) and Pamaria palmate (Rhodophyta). Food Chemistry 208, 161-168.

Singh, I., A. K. Rehni, R. Kalra, G. Joshi, M. Kumar, and H. Y. Aboul-Enein. 2007. Ion exchange resins: drug delivery and therapeutic applications. Journal of Pharmaceutical Science 32, 91-100.

Singh, P., A. Thakur, S. Dogra, G. Pankaj, L. M. Srivastav, and N. Kler. 2017. Comparison of osmolality of human milk after fortification with three different fortifiers. Current Medicine Research and Practice 7, Srinivasan, L., R. Bokiniec, C. King, G. Weaver, and A. D. Edwards. 2004. Increased osmolality of breast milk with therapeutic additives. Archives of Disease in Childhood. Fetal and Neonatal Edition 89, F514-F517.

Thoene, M., C. Hanson, E. Lyden, L. Dugick, L. Ruybal, and A. Anderson-Berry. 2014. Comparison of the effect of two human milk fortifiers on clinical outcomes in premature infants. Nutrients, 261-75.

Yoshimura, T., M. Shimoda, H. Ishikawa, M. Miyaki, K. Matsumoto, Y. Osajima, and I. Hayakawa. 2002. Effect of $CO_2$ flow rate on enzyme inactivation by continuous method with microbubbles of supercritical carbon dioxide. Journal of the Faculty of Agriculture Kyushu University 46, 345-352.

The invention claimed is:

1. A sterile fats-enriched fraction obtained by a process comprising:
   a) treating dried mammalian milk with a fats extracting agent at a pressure range of 2500-4500 psi (17237-31026 KPa), and temperature range of 40 to 75° C. to extract fats to provide a fats-enriched fraction, and a residual fraction comprising proteins and carbohydrates, wherein the fats extracting agent is supercritical carbon dioxide;
   b) separating said fats-enriched fraction from the residual fraction; and
   c) removing the fats extracting agent from the separated fats-enriched fraction to produce a dry fraction of oily, fats-enriched material, and a fraction enriched in proteins and carbohydrates,
   wherein the dried mammalian milk is freeze-dried/lyophilized milk.

2. A sterile fats-enriched fraction of mammalian milk, said fraction having components including immunoglobulins at levels 90% by weight or more of levels prior to sterilization.

3. The fraction of claim 2 having 100 colony forming units of microbes or less per 1 ml when reconstituted at 10% weight/weight in water.

4. A fortified milk composition comprising a fats-enriched fraction of claim 2.

* * * * *